(12) United States Patent
Tamura et al.

(10) Patent No.: US 10,297,225 B2
(45) Date of Patent: May 21, 2019

(54) INFORMATION PROCESSING SYSTEM AND INFORMATION PROCESSING METHOD CAUSING A PORTABLE COMMUNICATIONS TERMINAL TO COOPERATE WITH AN ELECTRONIC DEVICE

(71) Applicant: FUJITSU TEN LIMITED, Kobe-shi, Hyogo (JP)

(72) Inventors: Shizuka Tamura, Kobe (JP); Yoshitaka Hirashima, Kobe (JP); Toshio Kitahara, Kobe (JP); Toshihiro Murata, Tokyo (JP); Minoru Maehata, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 148 days.

(21) Appl. No.: 14/968,485

(22) Filed: Dec. 14, 2015

(65) Prior Publication Data

US 2016/0240169 A1 Aug. 18, 2016

(30) Foreign Application Priority Data

Feb. 13, 2015 (JP) ................................. 2015-026771

(51) Int. Cl.
*B60R 1/00* (2006.01)
*G09G 5/00* (2006.01)
(Continued)

(52) U.S. Cl.
CPC .............. *G09G 5/006* (2013.01); *B60R 1/00* (2013.01); *G06F 3/1423* (2013.01);
(Continued)

(58) Field of Classification Search
None
See application file for complete search history.

(56) References Cited

U.S. PATENT DOCUMENTS 6,125,326 A * 9/2000 Ohmura ............. G01C 21/3688
342/457
6,127,945 A * 10/2000 Mura-Smith .......... G01C 21/20
340/539.1
(Continued)

FOREIGN PATENT DOCUMENTS

JP 2011018161 A 1/2011
JP 2012145376 A 8/2012
(Continued)

*Primary Examiner* — Yingchun He
(74) *Attorney, Agent, or Firm* — Oliff PLC

(57) ABSTRACT

An information processing system according to the embodiments includes an in-vehicle device (electronic device), a portable communication terminal, a terminal position computing unit (computing unit), and a specific process executing unit (executing unit). The in-vehicle device is provided in a vehicle (predetermined facility). The portable communication terminal is capable of mutual communication with the in-vehicle device. The terminal position computing unit computes a position of the portable communication terminal based upon a motion of the portable communication terminal. The specific process executing unit, when the position of the portable communication terminal computed by the terminal position computing unit is a predetermined position that is predefined in the facility, executes a specific process corresponding to the predetermined position.

12 Claims, 18 Drawing Sheets

(51) Int. Cl.
*G09G 5/12* (2006.01)
*G09G 5/373* (2006.01)
*G09G 5/377* (2006.01)
*H04B 1/3822* (2015.01)
*H04L 29/08* (2006.01)
*H04W 88/02* (2009.01)
*H04W 4/02* (2018.01)
*G06F 3/14* (2006.01)

(52) U.S. Cl.
CPC ........... *H04L 67/125* (2013.01); *H04W 4/027* (2013.01); *B60R 2300/20* (2013.01); *B60R 2300/207* (2013.01); *G09G 2340/045* (2013.01); *G09G 2340/12* (2013.01); *G09G 2340/145* (2013.01); *G09G 2356/00* (2013.01); *G09G 2370/16* (2013.01); *G09G 2380/10* (2013.01)

(56) References Cited

U.S. PATENT DOCUMENTS

| | | | | |
|---|---|---|---|---|
| 2002/0152027 | A1* | 10/2002 | Allen | G01C 21/26 701/526 |
| 2009/0213032 | A1* | 8/2009 | Newport | G06F 1/1626 345/1.1 |
| 2012/0077475 | A1* | 3/2012 | Holcomb | G08G 1/005 455/414.1 |
| 2012/0143503 | A1* | 6/2012 | Hirai | G01C 21/3688 701/527 |
| 2013/0054129 | A1* | 2/2013 | Wong | B66F 9/063 701/408 |
| 2014/0062688 | A1* | 3/2014 | Aoki | B60K 37/02 340/441 |
| 2014/0067956 | A1* | 3/2014 | Tsunoda | H04L 67/22 709/204 |
| 2015/0046022 | A1* | 2/2015 | Bai | G07C 5/008 701/31.5 |

FOREIGN PATENT DOCUMENTS

| | | |
|---|---|---|
| JP | 2013-184547 A | 9/2013 |
| JP | 2014-026413 A | 2/2014 |
| JP | 2014-094615 A | 5/2014 |
| JP | 2015152497 A | 8/2015 |

* cited by examiner

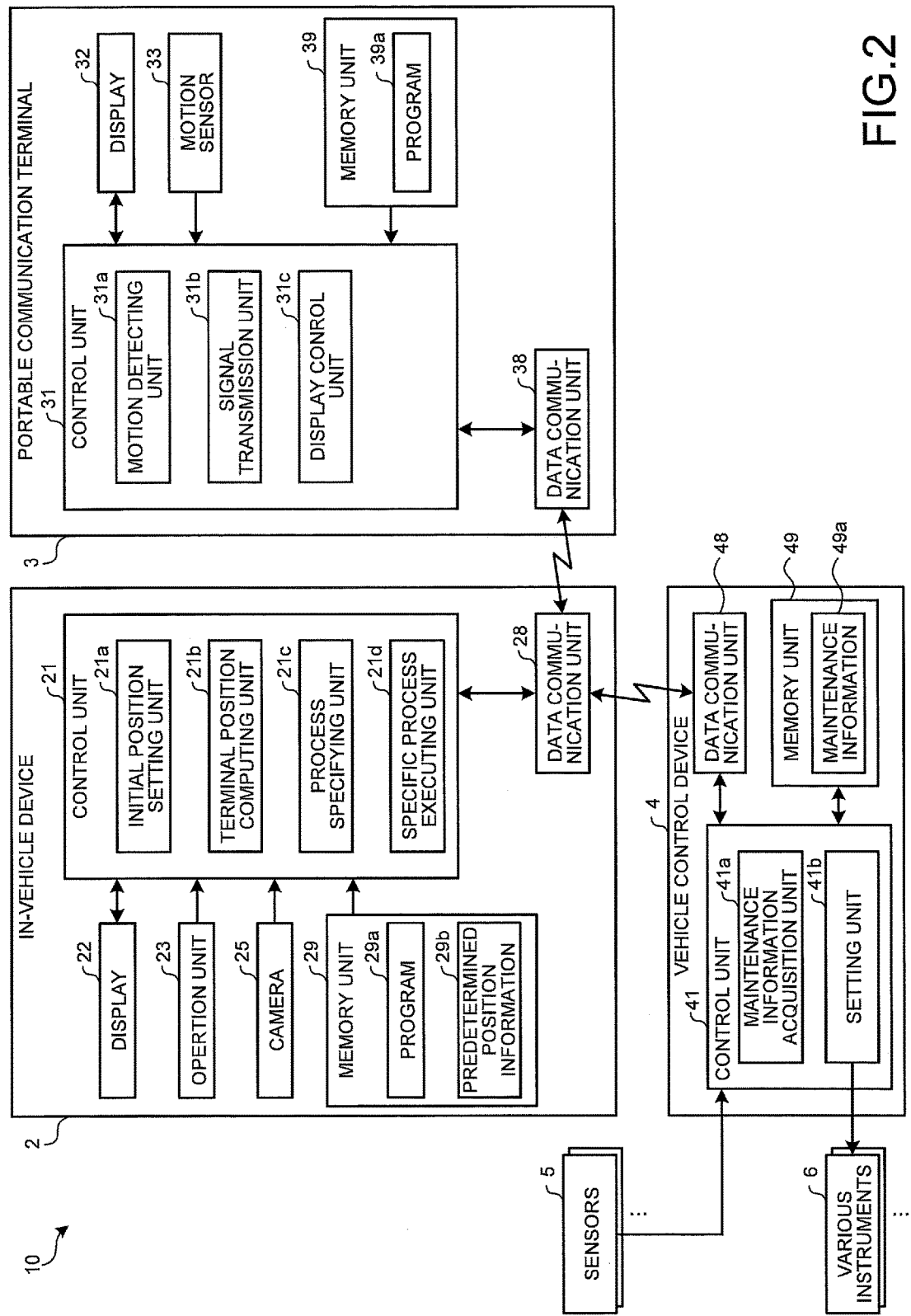

FIG.4A
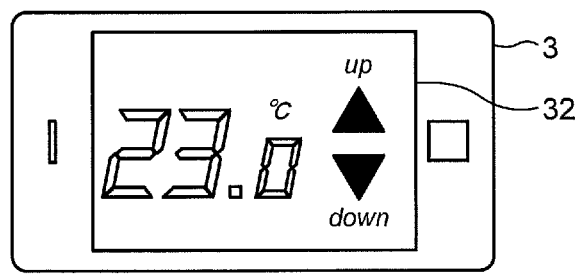
FIG.4B
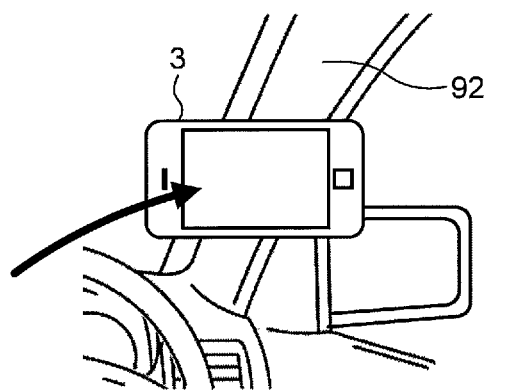
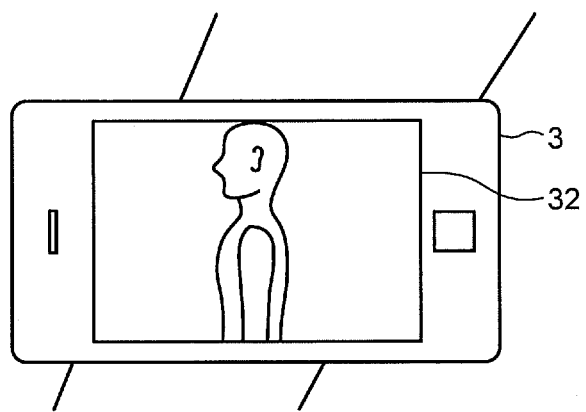

FIG.4C

| POSITIONS | FUNCTIONS PROVIDED |
|---|---|
| INDICATING/ACQUIRING PHYSICAL MAGNITUDE, ETC. | |
| SPEED METER | DISPLAYING DIGITAL METER IF ORIGINAL METER WAS ANALOG METER, OR VICE VERSA. |
| TACHOMETER | DITTO. DISPLAYING TACHOMETER IF CAR IS NOT EQUIPPED WITH IT. |
| TRIP METER | INDICATING MILEAGE. |
| FUEL METER | INDICATING POSITION OF FUEL TANK INLET. |
| ALL (E.G., ALARM AMP) | DISPLAYING INSTRUCTIONS ABOUT EACH POSITION (E.G., CONTENTS OF USER'S MANUAL). |
| WINDOWS | INDICATING UV RAYS (INTENSITY). |
| CARS RUNNING AROUND | INDICATING DESTINATIONS OF CARS GROUPED. |
| DISPLAYING/ACQUIRING PICTURES | |
| INTERIOR MIRROR | MAGNIFYING/REDUCING PICTURE IN INTERIOR MIRROR. |
| REAR-VIEW MIRROR | DISPLAYING PICTURE IN REAR-VIEW MIRROR UPON SHIFTING INTO REVERSE. |
| SIDE-VIEW MIRRORS | DISPLAYING VIEW TO DETECT SIDE COLLISION RISK ACCORDING TO WAY TO TRY TO TURN. |
| PILLARS | DISPLAYING EXTERNAL VIEW IN BLIND SPOT BEHIND PILLARS. |
| EXTERNAL VIEW | DISPLAYING EXTERNAL VIEW. |
| INTERIOR BLIND SPOTS | DISPLAYING VIEWS UNDER FRONT SEAT, BEHIND REAR SEAT (IN THE BOOT), ETC. |
| INDICATING/ACQUIRING MAINTENANCE INFORMATION | |
| GEAR KNOB | INDICATING DETERIORATION OF AUTOMATIC TRANSMISSION FLUID, ETC. |
| WIPERS | INDICATING ABRASION OF WIPER BLADES, ETC. |
| ENGINE HOOD | INDICATING MAINTENANCE CHECK POINTS SUCH AS OIL CHECK. |
| TYRES | INDICATING TYRE PRESSURE, TREAD ABRASION, ALERT ON WHETEHR OR NOT TYRE ROTATION OR ALIGNMENT IS NEEDED, BRAKE PAD ABRASION, ETC. |
| HEADLIGHTS | INDICATING LIFETIME OF HEADLIGHT BULBS, WORKABILITY CHECK, ETC. |
| BRAKE LIGHTS | INDICATING LIFETIME OF BRAKE LAMP BULBS, WORKABILITY CHECK, ETC. |
| PEDALS | INDICATING DETERIORATION AND OTHER CONDITIONS OF BRAKE AND CLUTCH FLUID. |
| INDICATING/ACQUIRING PHYSICAL MAGNITUDE, ETC. +OPERATION | |
| AIR CONDITIONER | IN THE EVENT OF NO TEMPERATURE INDICATION, INDICATING TEMPERATURE PRESET. ADJUSTING TEMPERATURE. |
| SEAT | INDICATING SEAT POSITION. ADJUSTING SEAT POSITION (ALTHOUGH SEAT IS LOCKED DURING DRIVING). |
| INTERIOR LIGHTS | INDICATING LIFETIME OF BULBS. ADJUSTING COLOR AND LUMINANCE. TURNING ON/OFF. |
| STEERING WHEEL | INDICATING DIAMETER AND OTHER FEATURES OF STEERING WHEEL. ADJUSTING TILT. |
| HORN | INDICATING TONE-COLOR/VOLUME OF THE HONK, ETC. ADJUSTING THEM. |

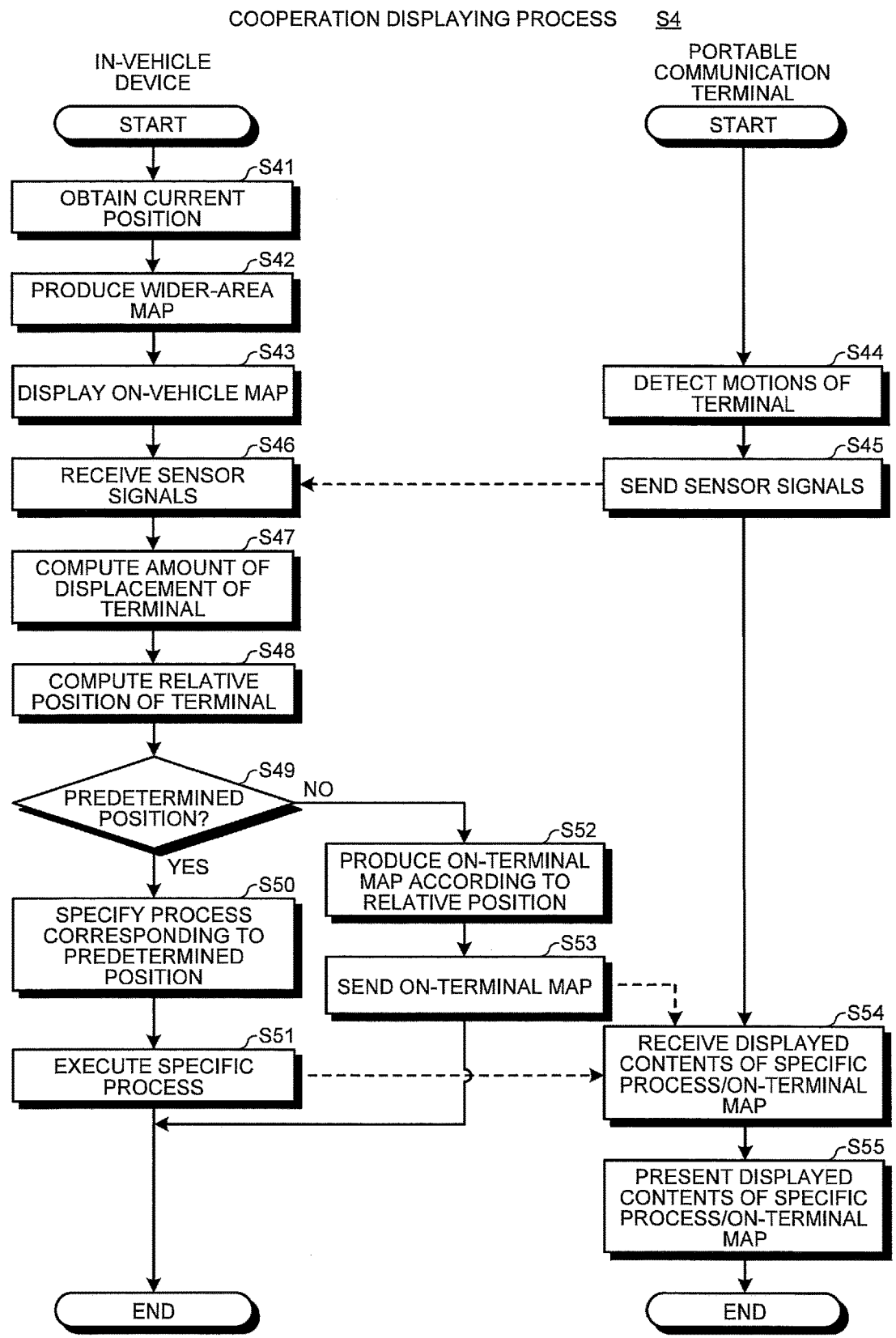

FIG.8

| IN-VEHICLE DEVICE | PORABLE COMMUNICATION TERMINAL (IN ARBITRARY POSITION) | PORABLE COMMUNICATION TERMINAL (IN PREDETERMINED POSITION) |
|---|---|---|
| NAVIGATING | | |
| DISPLAYING MAP OR DISPLAYING CAMERA PICTURES | IN THE VICINITY OF DISPLAY OF IN-VEHICLE DEVICE, PERMITTED TO ADJUST BIRD-VIEW PERSPECTIVE ANGLE OF BIRD-VIEW MAP OR VIEWING ANGLE OF MULTI-ANGLE IMAGE BY HOLDING TERMINAL UP AND CHANGING ITS ANGLE. | IN THE VICINITY OF DISPLAY OF IN-VEHICLE DEVICE, PERMITTED TO ADJUST TILT BY HOLDING TERMINAL UP AND CHANGING ITS ANGLE. |
| DISPLAYING MAP *POSSIBLY PRESENTING OTHER DISPLAYS | PERMITTED TO DISPLAY SUPPLEMENTARY INFORMATION ACCORDING TO RELATIVE POSITION TO DISPLAYED MAP. | PERMITTED TO DISPLAY TRAFFIC INFORMATION IN NEARBY AREA. |
| PRESENTING DUAL-WINDOW DISPLAYS SUCH AS DUAL-WINDOW ROAD MAP NEAR INTERSECTION *POSSIBLY PRESENTING OTHER DISPLAYS | PERMITTED TO DISPLAY ONE OF LATERALLY OR LONGITUDINALLY DIVIDED HALVES OF THE SCREEN ACCORDING TO ITS POSITION RELATIVE TO IN-VEHICLE DEVICE. | PERMITTED TO PRESENT THE SAME DUAL-WINDOW DISPLAYS AS ON THE IN-VEHICLE DEVICE. |
| REPLAYING MUSIC PIECE | | |
| DISPLAYING LIST OF MUSIC PIECES | PERMITTED TO DISPLAY PART OF LISTED INFORMATION THAT IS TOO MUCH TO DISPLAY ON THE IN-VEHICLE DEVICE. | PERMITTED TO ADJUST AUDIO SETTINGS OF EQUALIZER TUNING, LEFT-TO-RIGHT SPEAKERS BALANCING, AND FRONT-TO-REAR SPEAKERS BALANCING DURING REPLYING MUSIC ON IN-VEHICLE DEVICE. |
| DISPLAYING INFORMATION OF STAND-BYALBUM OR MUSIC PIECE COMING NEXT TO MUSIC PIECE CURRENTLY PLAYED | | |
| PRESENTING NAVIGATION GUIDE DISPLAYS | | |
| RIPPING (PRESENTING ARBITRARY DISPLAYS) | PERMITTED TO DISPLAY INFORMATION OF RIPPING PROCESS (INFORMATION OF MUSIC PIECES, THINGS IN PROGRESS, ETC.). | |
| INPUT INTERFACE | | |
| DISPLAYING LETTERS ARRANGED IN ALPHABETICAL ORDER DURING PROMPTING TO TYPE | PERMITTED TO PRESENT INPUT DISPLAYS OF TEN KEYS AND ALPHABET KEYS TO AID IN TYPING. *DISPLAYING ENLARGED KEYS IN ALPHABETICAL ORDER AND VARYING IN POSITION OF DISPLAYED SET OF LETTERS ACCORDING TO AMOUNT OF ITS DISPLACEMENT. | PERMITTED TO PRESENT INPUT DISPLAYS OF TEN KEYS AND ALPHABET KEYS TO AID IN TYPING. *DISPLAYED KEY ARRANGEMENT IN ALPHABETICAL ORDER IS FIXED. |
| PRESENTING INPUT DISPLAYS OF LETTERS | PERMITTED TO PRESENT ITS OWN LETTER INPUT INTERFACE. *DISPLAYING ENLARGED LETTER INPUT INTERFACE AND VARYING IN POSITION OF DISPLAYED SET OF LETTERS ACCORDING TO AMOUNT OF ITS DISPLACEMENT. | PERMITTED TO DISPLAY ITS OWN LETTER INPUT INTERFACE. *LETTER INPUT INTERFACE IS FIXEDLY DISPLAYED. |
| MANUAL | | |
| ARBITRARY DISPLAYS | PERMITTED TO DISPLAY MANUAL PAGES CORRESPONDING TO DISPLAYS CURRENTLY PRESENTED ON IN-VEHICLE DEVICE. *PRESENTING ENLARGED DISPLAYS OF INSTRUCTIONS THAT IS PART OF CONTENTS DESCRIBING POSITION WHERE TERMINAL IS (CORRESPONDING TO POSITION SUCH AS AN OPERATION SWITCH OR THE LIKE IN IN-VEHICLE DEVICE). | PERMITTED TO DISPLAY MANUAL PAGES CORRESPONDING TO DISPLAYS CURRENTLY PRESENTED ON IN-VEHICLE DEVICE. *SCROLLING OPERATION AND THE LIKE ARE CARRIED OUT BY OPERATING TERMINAL ITSELF. |
| AV | | |
| DISPLAYING TV/RADIO PROGRAM | PERMITTED TO DISPLAY TABLE OF PROGRAMS BROADCASTED ON NEXT CHANNEL BY HOLDING TERMINAL UP OVER IN-VEHICLE DEVICE TO ITS RIGHT. | PERMITTED TO DISPLAY TABLE OF PROGRAMS ON NEXT CHANNEL BY HOLDING TERMINAL UP OVER IN-VEHICLE DEVICE TO ITS RIGHT. |
| DISPLAYING TV PROGRAM | IF COMPATIBLE WITH DIGITAL TERRESTRIAL TV BROADCASTING SYSTEM, PERMITTED TO DISPLAY TV PROGRAM. FLICKING TERMINAL TO LEFT ENABLES SWITCHING TO ANOTHER CHANNEL. | IF COMPATIBLE WITH DIGITAL TERRESTRIAL TV BROADCASTING SYSTEM, PERMITTED TO DISPLAY TV PROGRAM. IN PREDETERMINED POSITION RELATIVE TO IN-VEHICLE DEVICE, FLICKING TERMINAL TO LEFT ENABLES TV OF IN-VEHICLE DEVICE TO SWITCH TO ANOTHER CHANNEL. |

# INFORMATION PROCESSING SYSTEM AND INFORMATION PROCESSING METHOD CAUSING A PORTABLE COMMUNICATIONS TERMINAL TO COOPERATE WITH AN ELECTRONIC DEVICE

CROSS-REFERENCE TO RELATED APPLICATION

This application is based upon and claims the benefit of priority of the prior Japanese Patent Application No. 2015-026771, filed on Feb. 13, 2015, the entire contents of which are incorporated herein by reference.

FIELD

The embodiments disclosed herein are directed to an information processing system and an information processing method.

BACKGROUND

Conventionally, an information processing system is known which includes an electronic device provided in a given facility and a portable communication terminal capable of intercommunication with the electronic device and performs information processing through the communication between the electronic device and the portable communication terminal.

As an example, this type of information processing system performs navigation processing for guiding a route to the destination by using a navigation device (in-vehicle device) provided in a vehicle and a portable communication terminal.

In a technology disclosed in Japanese Laid-open Patent Publication No. 2012-145376, an application program for navigation processing run on a portable communication terminal is determined upon performing the navigation processing, according to which of connection terminals in an in-vehicle device the portable communication terminal is to be connected with.

However, in the conventional technology mentioned above, there is a room for further improvement in that the convenience of the portable communication terminal is utilized, and simultaneously, the information processing corresponding to predetermined positions in a given facility is facilitated.

Specifically, the portable communication terminal can be easily moved, for example, in a vehicle interior from a place close to the in-vehicle device to another place far from the same, and has the convenience that the portable communication terminal is easy to perform intuitive operation such as holding it up over any of the predetermined positions it moves to or touching such position. In this regard, the conventional technology mentioned above is insufficient in the sense of exploitation of the convenience as mentioned above because functions of the portable communication terminal are restricted by the positions of the connection terminals in the in-vehicle device.

SUMMARY

According to an aspect of an embodiment, an information processing system includes an electronic device, a portable communication terminal, a computing unit, and an executing unit. The electronic device is provided in a predetermined facility. The portable communication terminal is capable of mutual communication with the electronic device. The computing unit computes a position of the portable communication terminal based upon a motion of the portable communication terminal. The executing unit, when the position of the portable communication terminal computed by the computing unit is a predetermined position that is predefined in the facility, executes a specific process corresponding to the predetermined position.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 10 is a diagram illustrating an example of a specific process suitable to a predetermined position;

FIG. 2 is a diagram illustrating a configuration of an information processing system according to a first embodiment;

FIGS. 4A and 4B are diagrams illustrating concrete examples of the specific process corresponding to the predetermined position;

FIG. 4C is a list illustrating other examples of the specific process corresponding to the predetermined position;

FIG. 7B is a diagram illustrating a processing sequence of the cooperation displaying process according to the second embodiment;

FIG. 8 is a list illustrating concrete examples of the specific process according to the second embodiment.

DESCRIPTION OF EMBODIMENTS

Preferred embodiments of the present invention will be explained with reference to accompanying drawings. In addition, the embodiments disclosed below are not intended to limit the present invention.

In the discussion below, an outline of the information processing method according to the embodiments will be described with reference to FIG. 1A to FIG. 1C, and thereafter, the information processing system to which the information processing method is applied will be described with reference to FIG. 2 to FIG. 9. In the discussion referring to FIGS. 2 to 4C, a first embodiment will be detailed, and in the discussion referring to FIG. 9, a third embodiment will be detailed.

The outline of the information processing method according to the embodiments will first be described with reference to FIG. 1A to FIG. 10. FIG. 1A is a schematic diagram illustrating an information processing system 10 according to embodiments. FIG. 1B is a schematic diagram of a vehicle interior 90 when viewed from the rear in the vehicle interior 90. FIG. 10 is a diagram illustrating an example of a specific process suitable to a predetermined position.

Figure 1A:
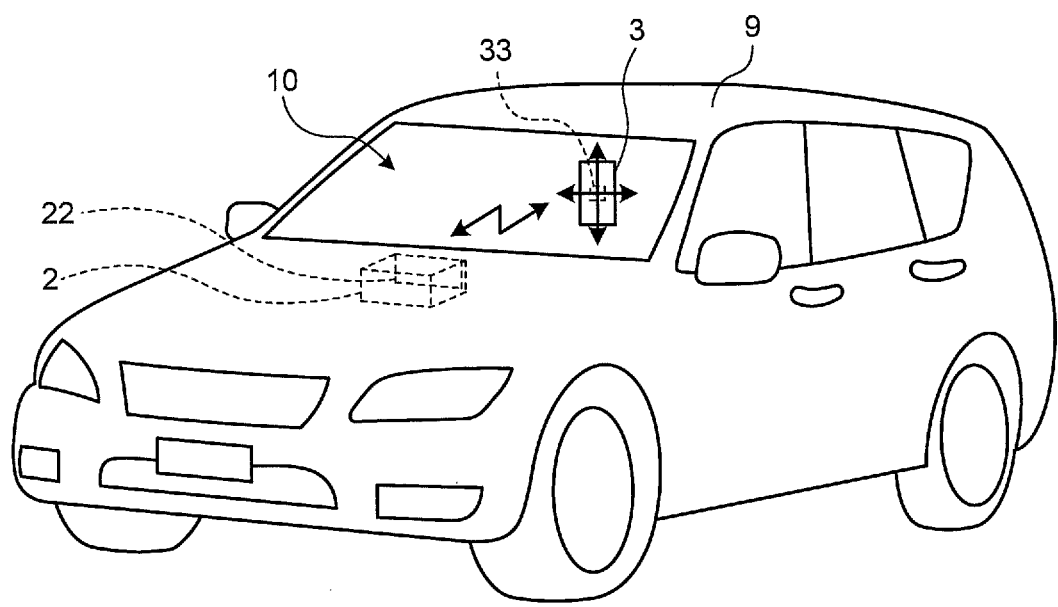
FIG. 1A is a schematic diagram illustrating an information processing system according to embodiments.

As illustrated in FIG. 1A, the information processing system 10 includes an in-vehicle device 2 loaded in a vehicle 9 such as an automobile, and a portable communication terminal 3 built independent of the in-vehicle device 2. The in-vehicle device 2 and the portable communication terminal 3 are adapted to work cooperatively with each other.

Both the in-vehicle device 2 and the portable communication terminal 3 have a wireless communication function following a predetermined communication standard protocol such as Bluetooth™. Thus, the in-vehicle device 2 and the portable communication terminal 3 can mutually send/receive signals through wireless communications. The in-vehicle device 2 and the portable communication terminal 3 may be connected in a concrete means of communication cable so that the in-vehicle device 2 and the portable communication terminal 3 are able to mutually send/receive signals through wired communications.

The in-vehicle device 2 is an electronic device fixedly loaded in the vehicle interior 90 of the vehicle 9, and has a display 22 presenting various images. The in-vehicle device 2 has a navigation function that, for example, guides the route to the destination preset by the user. The in-vehicle device 2 serves a driver occupying a driver's seat in the vehicle 9 as a primarily benefited user. Thus, the in-vehicle device 2 is positioned within the dashboard in the front part in the vehicle interior 90 of the vehicle 9 so that primarily the driver can see a screen of the display 22.

Meanwhile, the portable communication terminal 3 is a mobile communication terminal that has a telephone function available for the user hand-holding it. The portable communication terminal 3 is, for example, a smartphone or a cellar phone the user carries always and every day. The portable communication terminal 3 is primarily used by someone but the driver, who is in a front seat next to the driver or a back seat in the vehicle 9.

The portable communication terminal 3 has a motion sensor 33 and is able to detect motions, such as displacement and rotation, of itself. While the in-vehicle device 2 and the portable communication terminal 3 are working cooperatively, upon displacing the portable communication terminal 3 hand-held by the user, the motion sensor 33 of the portable communication terminal 3 detects the displacement of itself.

The portable communication terminal 3 sends a terminal signal indicating motion of itself to the in-vehicle device 2, and the in-vehicle device 2 receives the terminal signal to execute a process corresponding to the motion of the portable communication terminal 3 and a position it reaches. For instance, the user moves the portable communication terminal 3 and makes it reach a predetermined position, and thereby, a specific process suitable to the predetermined position can be executed by the in-vehicle device 2.

Figure 1B:
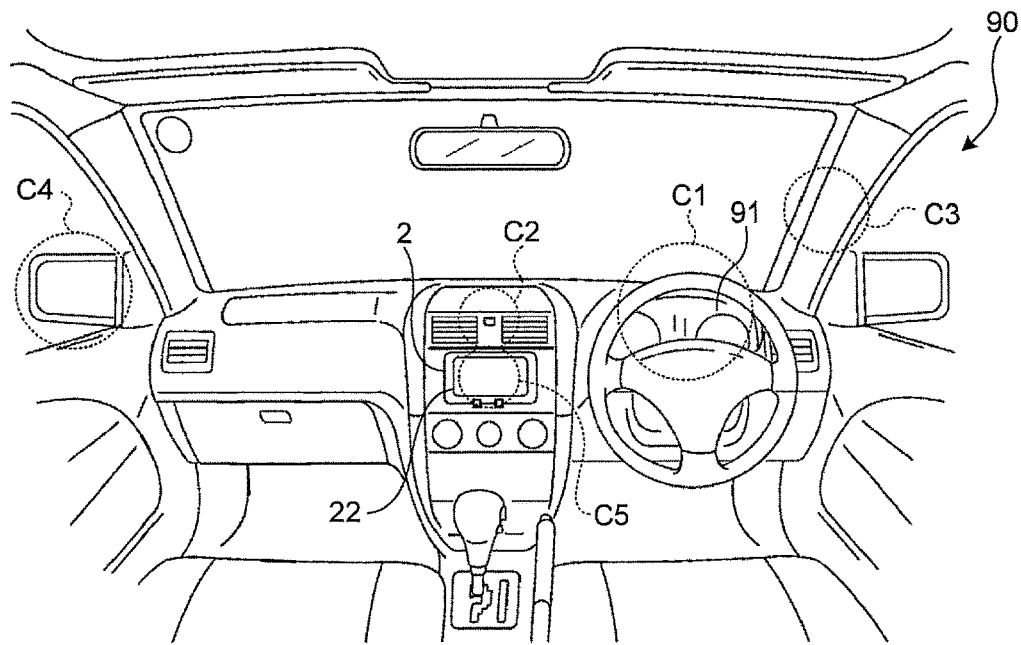
FIG. 1B is a schematic diagram illustrating a vehicle interior when viewed from the rear in the vehicle interior.
Figure 1C:
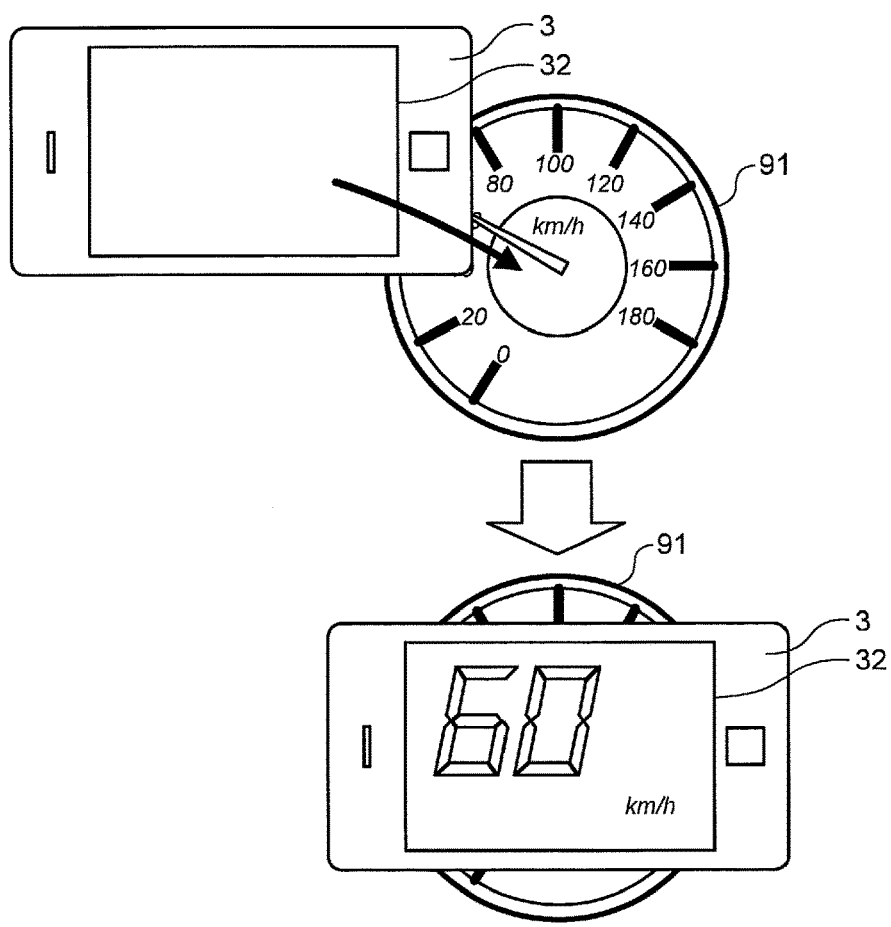
FIGS. 1D to 1G are diagrams illustrating modifications (Example 1 to Example 4) of the specific process suitable to the predetermined position.
Figure 1D:
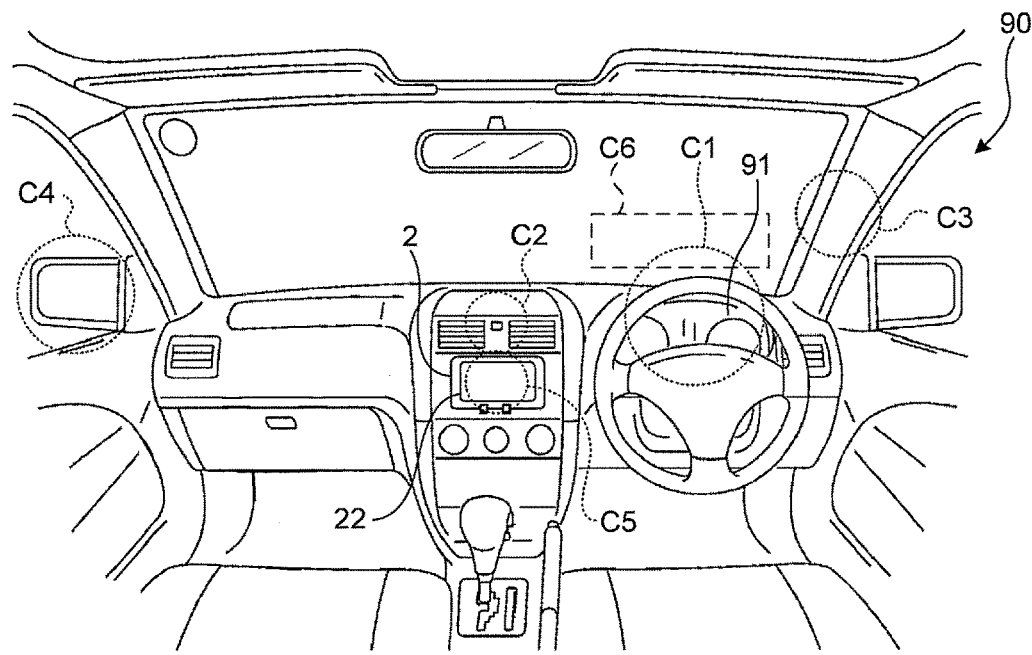
Figure 1E:
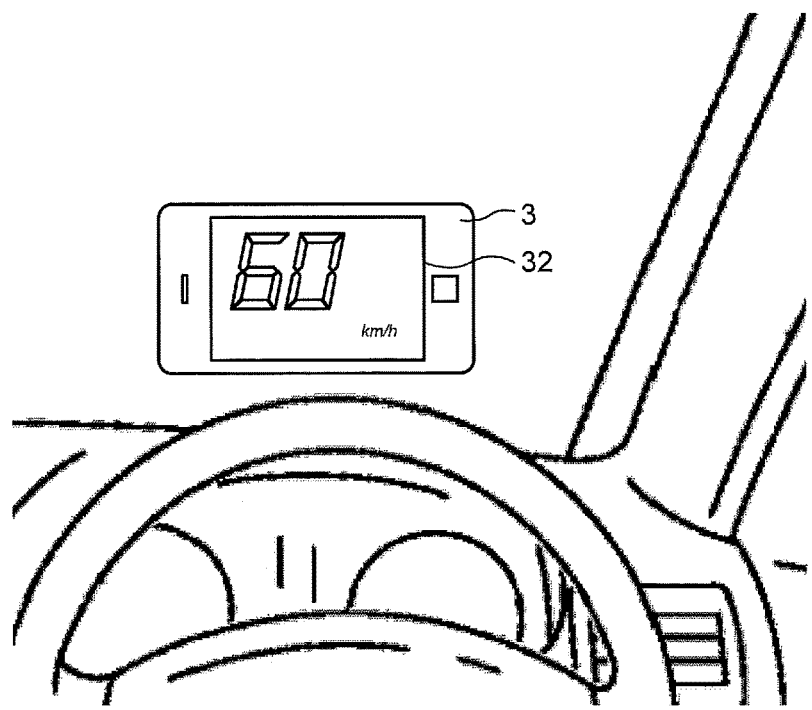
Figure 1F:
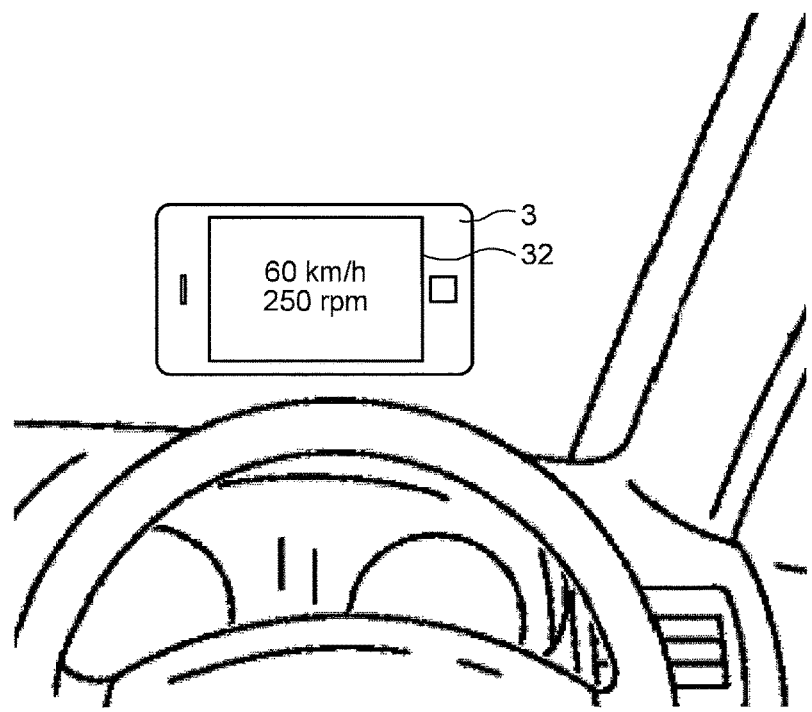
Figure 1G:
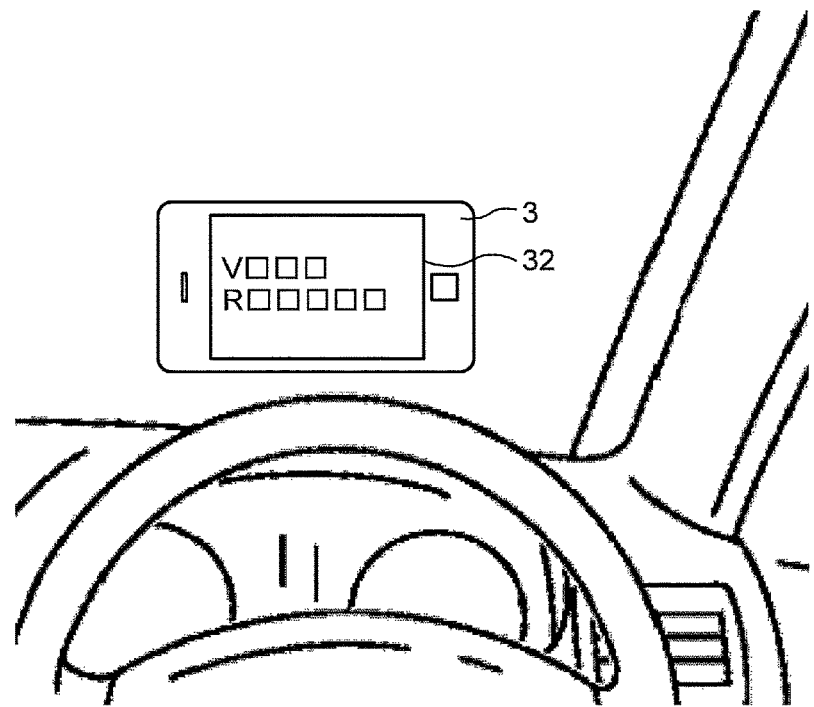

Specifically, it is now assumed, for example, that the user moves the portable communication terminal 3 to the vicinity of an instrument panel (indicator board) circled by closed curved line C1 as illustrated in FIG. 1B, and makes it reach the place where a speed meter 91 is installed, which is intended as the predetermined position.

In addition to that, when the user holds the portable communication terminal 3 up over the speed meter 91 that is an analog meter as illustrated on the upper side of FIG. 10, according to the present embodiments, the portable communication terminal 3 presents on its display 32 the speed meter 91 as a digital meter, for example, as illustrated on the lower side of FIG. 10. In other words, information processing that makes the portable communication terminal 3 function as a sub-display for auxiliary display of the speed meter 91 is carried out.

In this way, according to the present embodiments, the information processing suitable to the predetermined position is executed by an intuitive operation of the portable communication terminal 3 at the predetermined position it reaches (an operation of holding it up over the predetermined position, touching such a position, shaking over such a position, or the like).

In this way, the user, by his or her intuitive operation with the portable communication terminal 3, can easily obtain the information he or she wants to know on the position of his or her concern, for example. Thus, according to the present embodiments, the convenience of the portable communication terminal 3 can be exploited, and similarly, the information processing corresponding to the predetermined position in a given facility can be facilitated.

Although the embodiments have been described so far by using the speed meter 91 as the example, they are applicable to other various predetermined positions in the vehicle interior 90 as well as the remaining meters around the instrument panel. For instance, a position around the air-conditioner circled by closed curved line C2 in FIG. 1B, a position around the pillar circled by closed curved line C3, a position near the side-view mirror circled by closed curved line C4, and the like may be included, and the specific process suitable to each position can be executed. These matters will be described in detail later in conjunction with FIG. 3A to FIG. 3C.

Moreover, according to the embodiments, for example, it is possible to execute the information processing in which the in-vehicle device 2 circled by closed curved line C5 in FIG. 1B and the portable communication terminal 3 are cooperative with each other. In one example, the portable communication terminal 3 can present on its display 32 a part of an imaginary image that is enlarged beyond a display area on the display 22 of the in-vehicle device 2. Such a part of the imaginary enlarged image corresponds to the position the portable communication terminal 3 is in.

On the other hand, while performing cooperative displaying with the in-vehicle device 2, the portable communication terminal 3, in the event that it reaches the above-mentioned predetermined position, may perform information display about the specific process suitable to the predetermined position. This will be detailed later when the second embodiment is discussed.

A variation of the specific process illustrated in FIG. 10 will also be discussed. FIGS. 1D to 1G are diagrams illustrating modifications (Example 1 to Example 4) of the specific process suitable to the predetermined position. As illustrated in FIG. 1D to FIG. 1G, when the portable communication terminal 3 is brought in an area C6 above the instrument panel including the speed meter 91, a mathematical value indicated by the speed meter 91 can be presented on the display 32. The information displayed includes mathematical values derived from a tachometer as well as the speed meter 91, information about gear change, and the like.

Also, a holder to keep the portable communication terminal 3 may be provided above the instrument panel. In such a case, the portable communication terminal 3, when put in the holder, presents on its display 32 a mathematical value corresponding to that indicated by the speed meter 91 or any other meter.

Configurations to execute the specific process suitable to the predetermined position will first be discussed as the first embodiment.

[a] First Embodiment

FIG. 2 is a diagram illustrating a configuration of the information processing system 10 according to the first embodiment. As can be seen in FIG. 2, the information processing system 10 include the in-vehicle device 2, the portable communication terminal 3, and a vehicle control device 4.

The in-vehicle device 2 includes a control unit 21, a display 22, an operation unit 23, a camera 25, a data communication unit 28, and a memory unit 29. The control unit 21 has a CPU, a RAM, a ROM, and the like, and works as a microcomputer that controls the entire in-vehicle device 2.

The display 22, for example, has a liquid crystal panel and displays a variety of images. The display 22 also has a touch panel and serves as an operation console unit receiving operation by the user. When the user operates the display 22 as a touch panel, signals indicating work of such operation are input to the control unit 21.

The operation unit 23 is an operation console unit directly receiving operation by the user. The operation unit 23, for example, has a plurality of operation buttons arranged beneath the screen of the display 22. When the user operates the operation unit 23, signals indicating work of such operation are input to the control unit 21.

The camera 25 has a lens unit and an image pickup device and photographs an object to electronically obtain a photographed image. The camera 25, for example, is located at top of the screen of the display 22 (see FIG. 5A). By virtue of this, the camera 25 photographs an object in front of the screen of the display 22 and obtains a photographed image with an image of the object.

The data communication unit 28 sends/receives signals between the portable communication terminal 3 and the vehicle control device 4 by a predetermined communication standard protocol. Although it does not matter that both of them communicate by wireless means or wired means, at least the communications between the in-vehicle device 2 and the portable communication terminal 3 are preferably conducted by wireless means.

The data communication unit 28 receives, from the portable communication terminal 3, terminal signals indicating motions of the portable communication terminal 3. The data communication unit 28 sends, to the portable communication terminal 3, an image to be displayed on the portable communication terminal 3. The data communication unit 28 receives, from the vehicle control device 4, signals including information derived from the vehicle control device 4. Also, the data communication unit 28 receives setting signals transmitted from the portable communication terminal 3 for setting various instruments 6 and then sends them to the vehicle control device 4.

The memory unit 29 is, for example, a nonvolatile memory, such as a flash memory, that stores a variety of information. The memory unit 29 stores a program 29*a* executable on the control unit 21, and a predetermined position information 29*b* including information about predetermined positions in the vehicle interior 90 and a particular process corresponding to each of the predetermined positions. The CPU of the control unit 21 executes arithmetic operations in conformity with the program 29*a*, and thereby, for instance, a processing unit with a variety of functions, such as a navigation function, manifested by the in-vehicle device 2 can be implemented through software-based virtualization in the control unit 21.

An initial position setting unit 21*a*, a terminal position computing unit 21*b*, a process specifying unit 21*c*, and a specific process executing unit 21*d* illustrated in the drawing are part of the processing unit implemented through software-based virtualization by executing the program 29*a*.

The initial position setting unit 21*a* and the terminal position computing unit 21*b* execute a process involved in computing a position of the portable communication terminal 3 (terminal position) in the vehicle interior 90. The terminal position of the portable communication terminal 3 is defined, for example, based on the center position of the screen of the display 22 in the in-vehicle device 2.

Thus, the center position of the screen of the display 22 is employed as a reference position, and then, the terminal position is sought as a position relative to the reference position. In addition, a displacement and a direction of the portable communication terminal 3 are computed based upon the motion detected by the motion sensor 33.

The process specifying unit 21*c* determines whether or not the terminal position thus computed is identical with the predetermined position, and if so, the process specifying unit 21*c* refers to the predetermined position information 29*b* and then executes a process involved in specifying a process corresponding to the predetermined position. The specific process executing unit 21*d* executes the specific process thus specified by the process specifying unit 21*c*.

On the other hand, the portable communication terminal 3 includes a control unit 31, a display 32, a motion sensor 33, a data communication unit 38, and a memory unit 39. The control unit 31 has a CPU, a RAM, a ROM, and the like, and serves as a microcomputer controlling the entire portable communication terminal 3.

The display 32, for example, has a liquid crystal panel so as to display various images. Also, the display 32 has a touch panel and serves as an operation console unit receiving operation by the user. When the user operates the display 32 as a touch panel, signals indicating work of such operation are input to the control unit 31.

The motion sensor 33 detects motions of itself. The motion sensor 33 is, for example, a 6-axis sensor capable of detecting 3-axial acceleration and 3-axial angular velocity. More specifically, on the assumption of XYZ rectangular coordinate system, the motion sensor 33 can detect displacement along each of the X-, Y-, and Z-axes (3-axial acceleration) and rotation about each of the X-, Y-, and Z-axes (3-axial angular velocity). When an object is traveling at a certain velocity and is acted on by angular velocity, apparent force (Coriolis force) is developed. Additionally, when the object is acted on by acceleration, force is developed (Newton's Laws). The motion sensor 33 detects the 3-axial angular velocity and the 3-axial acceleration on these theories.

The data communication unit 38 sends/receives signals to and from the in-vehicle device 2, following a predetermined communication standard protocol. It is not matter that the communications between them rely on either wireless means or wired means. The data communication unit 38 transmits to the in-vehicle device 2 terminal signals indicating motions of the portable communication terminal 3. Also, the data communication unit 38 receives from the in-vehicle device 2 an image to be displayed on the portable communication terminal 3. Furthermore, the data communication unit 38 produces setting signals for setting various instruments 6, which are relayed by the in-vehicle device 2 eventually to the vehicle control device 4.

The memory unit 39 is, for example, a nonvolatile memory, such as a flash memory, capable of storing a variety of information. The memory unit 39 stores an application program 39a executable on the control unit 31. The CPU of the control unit 31 executes arithmetic operations in conformity with the program 39a, and thereby, a processing unit with a variety of functions can be implemented through software-based virtualization in the control unit 31.

A motion detecting unit 31a, a signal transmission unit 31b, and a display control unit 31c illustrated in the drawing are part of the processing unit implemented through software-based virtualization by executing the program 39a.

The motion detecting unit 31a controls the motion sensor 33 and obtains from the motion sensor 33 sensor signals indicating motions of itself. Such sensor signals are signals indicating 3-axial acceleration and 3-axial angular velocity. A signal transmission unit 30b controls the data communication unit 38 and transmits the sensor signals obtained by a motion detecting unit 30a to the in-vehicle device 2 as the terminal signals.

A display control unit 30c controls the display 32 to permit the display 32 to present images received by the data communication unit 38 from the in-vehicle device.

The vehicle control device 4 includes a control unit 41, a data communication unit 48, and a memory unit 49. The control unit 41 has a CPU, a RAM, a ROM, and the like, and serves as a microcomputer that controls the entire vehicle control device 4.

The vehicle control device 4 is connected in communication with various sensors 5 to detect various information about the maintenance of the vehicle 9. Additionally, the vehicle control device 4 is connected in communication with various instruments 6 (e.g., an air conditioner and the like) that are installed in the vehicle 9. Such instruments 6 receive the setting signals that the vehicle control device 4 receives from the portable communication terminal 3 via the in-vehicle device 2, and perform setting according to the setting signals.

The memory unit 49 is, for example, a nonvolatile memory, such as a flash memory, that stores various information. The memory unit 49 stores programs (not illustrated in the drawing) executable on the control unit 41 and maintenance information 49a including various information about the maintenance of the vehicle 9. The CPU of the control unit 41 conducts arithmetic operations in conformity with the programs not illustrated in the drawing, and thus, the processing unit with various functions manifested by the vehicle control device 4 can be implemented through software-based virtualization in the control unit 41.

A maintenance information acquisition unit 41a and a setting unit 41b illustrated in the drawing are part of the processing unit implemented through software-based virtualization by executing the above-mentioned programs. The maintenance information acquisition unit 41a diagnoses itself based on the information detected by the sensors 5 and makes the memory unit store the diagnose results and other information as maintenance information 49a.

The setting unit 41b causes the instruments 6 to set themselves based on the setting signals transmitted to each of them from the portable communication terminal 3.

Figure 3A:
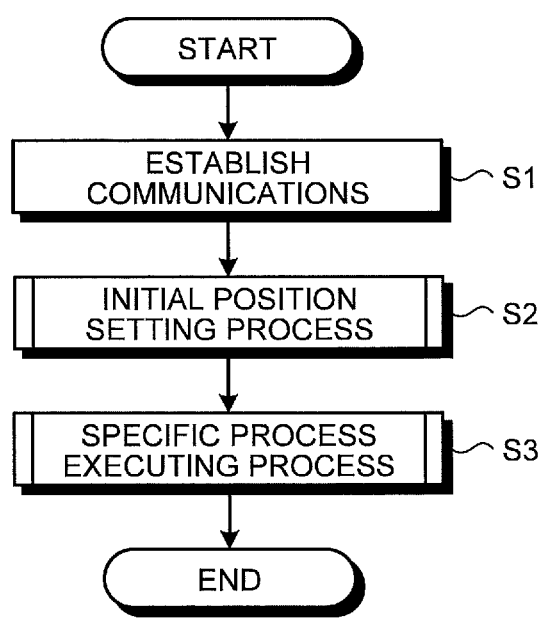
FIG. 3A is a diagram illustrating a processing sequence until the execution of the specific process at the predetermined position according to the first embodiment.

A processing sequence executed in the information processing system 10 until the end of specific process executing corresponding to predetermined positions will be described with reference to FIG. 3A. FIG. 3A is a diagram illustrating a processing sequence until the execution of the specific process at any of predetermined positions according to the first embodiment. At the beginning of the processing sequence, an application software program dedicated to coming in cooperation with the in-vehicle device 2 is executed on the portable communication terminal 3. In this way, the motion detecting unit 31a, the signal transmission unit 31b, and the display control unit 31c are enabled in the portable communication terminal 3.

First, the in-vehicle device 2 and the portable communication terminal 3 perform a negotiation to seek for connection between them to establish a state of enabling communications (Step S1). By virtue of such processing, succeedingly, mutual communications are enabled between the in-vehicle device 2 and the portable communication terminal 3.

Then, an initial position setting process for setting an initial position of the portable communication terminal 3 is executed (Step S2). In such an initial position setting process, the position the portable communication terminal 3 lies in at the beginning of the cooperative work is set as the initial position.

Subsequently, the in-vehicle device 2 and the portable communication terminal 3 work cooperatively with each other to compute the terminal position, and when the terminal position is any of the predetermined positions, a specific process executing process for executing the corresponding specific process is executed (Step S3).

Then, a detailed processing sequence of each of the initial position setting and the specific process executing will be described.

Figure 3B:
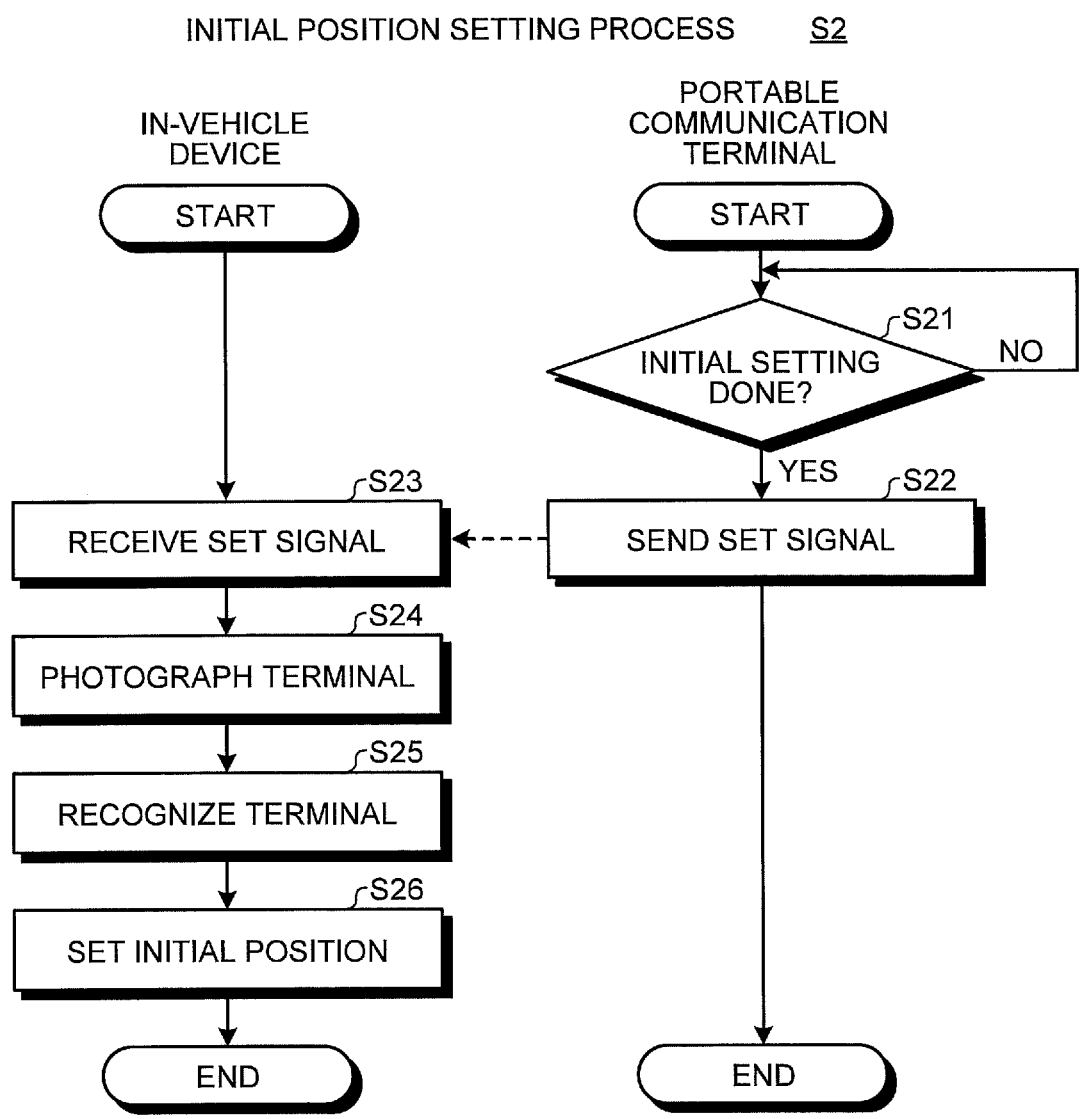
FIG. 3B is a diagram illustrating a processing sequence of an initial position setting process according to the first embodiment.

Above all, a processing sequence of the initial position setting for setting the initial position of the portable communication terminal 3 (Step S2 in FIG. 3A) will be discussed. FIG. 3B is a diagram illustrating a processing sequence of the initial position setting process according to the first embodiment. The left column of the drawing sheet depicts a processing sequence on the in-vehicle device 2 while the right column depicts a processing sequence on the portable communication terminal 3.

First, the signal transmission unit 31b of the portable communication terminal 3 determines whether or not the user has conducted an initial setting operation for setting the initial position (Step S21). The user is permitted to perform the initial setting operation by touching command buttons visualized in the display 32 serving as a touch panel. The user moves the portable communication terminal 3 to the front vicinity of the screen of the display 22 and then conducts the initial setting operation.

When the initial setting operation has been done (Step S21, Yes), the signal transmission unit 31b controls the data communication unit 38 to send to the in-vehicle device 2 a set signal indicating that the initial setting operation has been done (Step S22). When the initial setting operation has not been done (Step S21, No), the processing in Step S21 is repeated.

The data communication unit 28 of the in-vehicle device 2 receives the set signal sent from the portable communication terminal 3 (Step S23). In response to the receipt of the set signal, the initial position setting unit 21a of the in-vehicle device 2 controls the camera 25 to execute photographing. The camera 25 photographs the portable communication terminal 3 lying in front of the screen of the display 22 (Step S24). In this way, the initial position setting unit 21a obtains a photographed image including an image of the portable communication terminal 3.

Subsequently, the initial position setting unit 21a recognizes the image of the portable communication terminal 3 in the photographed image obtained (Step S25). The initial position setting unit 21a can recognize the image of the portable communication terminal 3 in the photographed image, for example, by some well-known means like pattern matching.

Subsequently, the initial position setting unit 21a sets the initial position of the portable communication terminal 3 based upon a position of the image of the portable communication terminal 3 in the photographed image (Step S26). Based upon a deviation of the position of the image of the portable communication terminal 3 from the center of the photographed image, the initial position setting unit 21a computes direction and amount of deviation of the actual position of the portable communication terminal 3 from the reference position (the center position of the screen of the display 22). In this way, the initial position setting unit 21a sets the initial position of the portable communication terminal 3 by using the reference position as a point of reference.

Figure 3C:
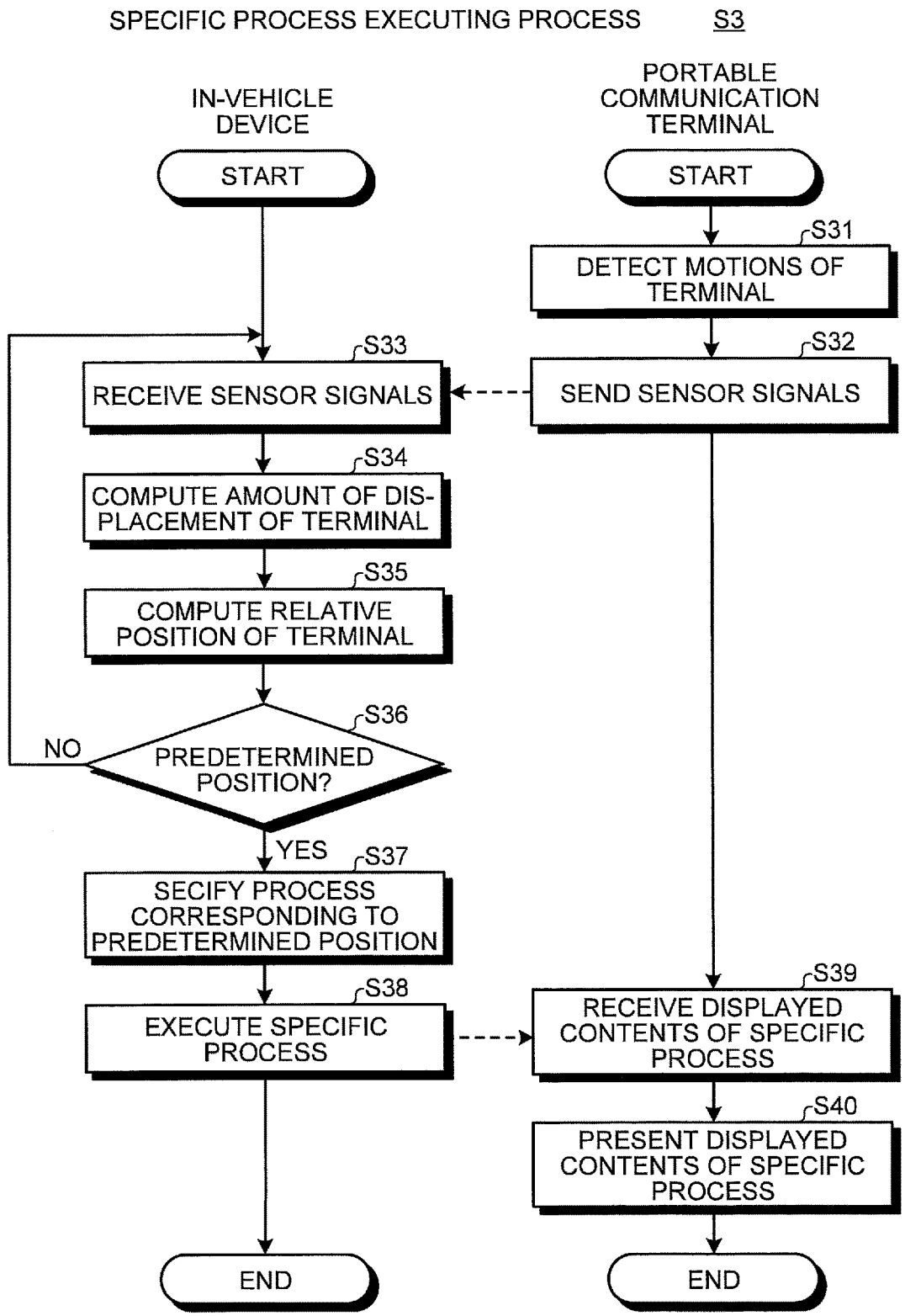
FIG. 3C is a diagram illustrating a processing sequence of a specific process executing process according to the first embodiment.

Then, another processing sequence of the specific process executing will be discussed where the in-vehicle device 2 and the portable communication terminal 3 cooperatively work to compute the position of the portable communication terminal 3, and when the position of the portable communication terminal 3 is any of the predetermined positions, the corresponding specific process is executed (Step S3 in FIG. 3A). FIG. 3C is a diagram illustrating the processing sequence of the specific process executing process according to the first embodiment. The left column in the drawing sheet depicts a series of processing on the in-vehicle device 2 while the right column in the drawing sheet depicts another series of processing on the portable communication terminal 3.

First, the motion sensor 33 detects motions of the portable communication terminal 3 (Step S31). The motion detecting unit 31a controls the motion sensor 33 to obtain sensor signals indicating the motions of the portable communication terminal 3. Such sensor signals indicate 3-axial acceleration and 3-axial angular velocity, as mentioned above.

Subsequently, the signal transmission unit 31b of the portable communication terminal 3 controls the data communication unit 38 to send to the in-vehicle device 2 the sensor signals as terminal signals according to the motions of the portable communication terminal 3 (Step S32).

The data communication unit 28 of the in-vehicle device 2 receives the sensor signals sent from the portable communication terminal 3 (Step S33). The terminal position computing unit 21b of the in-vehicle device 2 computes, based upon the 3-axial acceleration indicated by the sensor signals, an amount of axial displacement of the portable communication terminal 3 from the terminal position previously computed along each of the three axes (Step S34).

Furthermore, the terminal position computing unit 21b cumulatively adds the amounts computed in the past of such displacement of the portable communication terminal 3 to compute the amount of the axial displacement of the portable communication terminal 3 from the initial position along each of the three axes. As stated above, the initial position has been set relative to the aforementioned reference position in the initial position setting process. Thus, the terminal position computing unit 21b computes a relative position of the portable communication terminal 3 to the reference position, based upon the initial position determined by the reference position used as a point of reference and the amounts of the 3-axial displacement of the portable communication terminal 3 from the initial position (Step S35).

Subsequently, the process specifying unit 21c determines from the relative position thus computed whether or not the terminal position is any of the predetermined positions (Step S36). If the terminal position is any of the predetermined positions (Step S36, Yes), the process specifying unit 21c, referring to the predetermined position information 29b, specifies the process corresponding to the predetermined position (Step S37). Otherwise, if the terminal position is not any of the predetermined positions (Step S36, No), the series of the processing from Step S33 is repeated.

Then, the specific process executing unit 21d executes the specific process corresponding to the predetermined position (Step S38). In addition, the specific process executing unit 21d controls the data communication unit 28 to send to the portable communication terminal 3 displayed contents (not illustrated) according to the specific process executing. In this way, the specific process executing unit 21d permits the portable communication terminal 3 to present the displayed contents according to the specified process.

The data communication unit 38 of the portable communication terminal 3 receives the displayed contents according to the specific process that have been sent from the in-vehicle device 2 (Step S39). In response to the receipt, the display control unit 31c of the portable communication terminal 3 controls the display 32 to cause the display 32 to present the displayed contents according to the specific process that have been received from the in-vehicle device 2 (Step S40). In this way, the portable communication terminal 3 is permitted to present the displayed contents of the specific process corresponding to any of the predetermined positions.

Then, several variations of the specific process will be described in conjunction with FIG. 4A to FIG. 4C. FIG. 4A and FIG. 4B are diagrams (Example 1 and Example 2) illustrating concrete examples of the specific process corresponding to the predetermined positions. FIG. 4C is a list illustrating some other examples of the specific process corresponding to the predetermined positions.

Illustrated in FIG. 4A, for example, is a variation of the specific process corresponding to the predetermined position around an air conditioner (see the closed curved line C2 in FIG. 1B). When the air conditioner is of a type without temperature indication, definite operation of the portable communication terminal 3 in the predetermined position around the air conditioner may cause the display 32 to represent a temperature preset at present, as illustrated in FIG. 4A. In this way, the low-grade vehicle 9 can exhibit a feature available in high-grade automobiles.

Such definite operation is preferably an intuitive operation available by using the portable communication terminal 3, such as an operation of holding it up over any of the predetermined positions, touching such a position, shaking over such a position, or the like. In addition, once the definite operation is conducted, the displayed contents of the specific process corresponding to any of the predetermined positions can be retained after the portable communication terminal 3 is moved from the predetermined position.

The definite operation can be cancelled by some counteraction intuitive cancel operation. Such cancel operation cancels retention of the displayed contents of the specific process. The operation is not limited to the intuitive operation as has been described so far, and alternatively, a holder of the portable communication terminal 3 is provided in some given position, for example, to replace the definite/cancel operation with putting/removing the portable communication terminal 3 in/from the holder.

Also, as illustrated in FIG. 4A, operation buttons such as 'up' and 'down' may be displayed, so that the preset temperature can be adjusted by prompting the user to operate the operation buttons. Alternatively, the present temperature may be adjusted by tilting the portable communication terminal 3 in directions indicated by the 'up' and 'down'.

Further alternatively, as depicted on the upper side of FIG. 4B, the definite operation of the portable communication terminal 3 in the predetermined position around a pillar 92 (see closed curved line C3 in FIG. 1B) may enable the display 32 to present an external view of a blind spot shielded by the pillar 92, as illustrated on the lower side of FIG. 4B. In this way, effects of accident prevention and safety enhancement can be achieved as well. Such display of the external view in the blind spot may be applied as the specific process corresponding to the predetermined position to some other zone like the vicinity of a side-view mirror (see closed curved line C4 in FIG. 1B).

As to the predetermined positions corresponding to the remaining various vehicle points, examples of the functions provided by the specific processes respectively corresponding to some of such predetermined positions are illustrated in FIG. 4C. For example, the functions in a section Indicating/Capturing Maintenance Info illustrated in FIG. 4C can be implemented by communications with the vehicle control device 4 illustrated in FIG. 2. What have been set forth so far in FIG. 4A to FIG. 4C are given simply by way of example and are not interpreted as limiting the specific process to the restricted types.

As has been described, the information processing system according to the first embodiment includes an in-vehicle device (electronic device), a portable communication terminal, a terminal position computing unit (computing unit), and a specific process executing unit (executing unit). The in-vehicle device is provided in a vehicle (given facility). The portable communication terminal is in mutual communication with the in-vehicle device. The terminal position computing unit computes a position of the portable communication terminal based upon motions of the portable communication terminal. When the position of the portable communication terminal computed by the terminal position computing unit is any of predetermined positions that are predefined in the vehicle, the specific process executing unit executes the specific process corresponding to that predetermined position.

Thus, in accordance with the information processing system according to the first embodiment, the convenience of the portable communication terminal can be exploited, and simultaneously, the information processing corresponding to any of the predetermined positions in the vehicle can be facilitated.

Although, so far, the configuration for executing the specific process suitable to any of the predetermined positions the portable communication terminal 3 is to lie in has been described, an alternative modification based on such a configuration may perform information processing in which information display on the in-vehicle device 2 and information display on the portable communication terminal 3 work cooperatively. Such a case will be detailed below as a second embodiment. The second embodiment will be discussed by using a case as the example where the in-vehicle device 2 takes over the information display regarding navigation.

[b] Second Embodiment

Figure 5A:
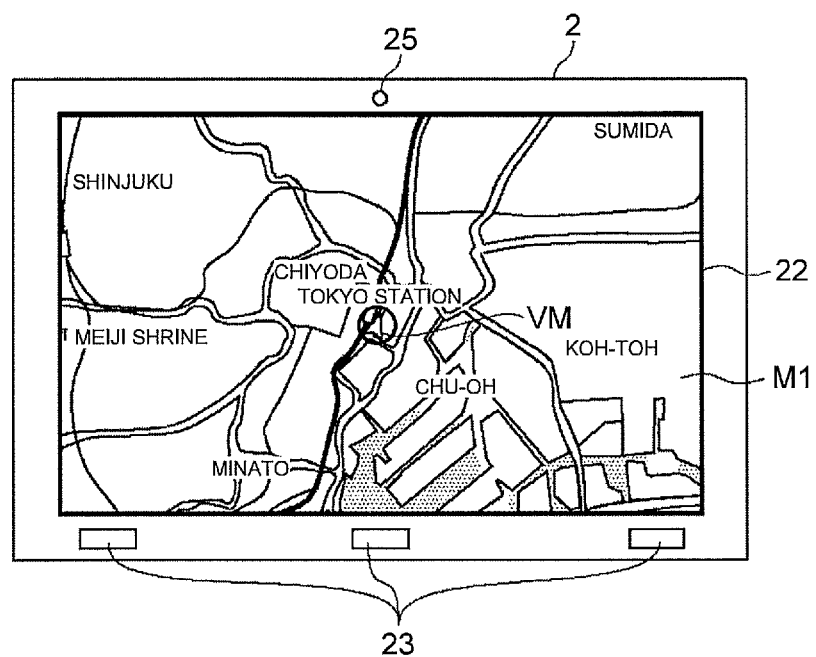
FIG. 5A is a diagram illustrating a state of information display by an in-vehicle device not in cooperation with a portable communication terminal.

FIG. 5A is a diagram illustrating a state of information display by the in-vehicle device 2 not in corporation with the portable communication terminal 3. As illustrated in FIG. 5A, the in-vehicle device 2 presents the on-vehicle map M1 on its display 22.

The on-vehicle map M1 is a map of an area including the current position (i.e., the position the vehicle 9 is in at present). The on-vehicle map M1 represents its center corresponding to the current position and has a vehicle mark VM denoting the position of the vehicle 9 at its enter. Thus, the vehicle mark VM is placed in the center position of the screen of the display 22 presenting the on-vehicle map M1.

The user (the driver of the vehicle 9 in most cases), viewing the on-vehicle map M1 presented by the display 22, recognizes the map of the vicinity of the current position. In the example illustrated in FIG. 5A, the current position is in the vicinity of the 'Tokyo Station', and the on-vehicle map M1 with the 'Tokyo Station' almost centered therein is presented by the display 22 of the in-vehicle device 2.

Figure 5B:
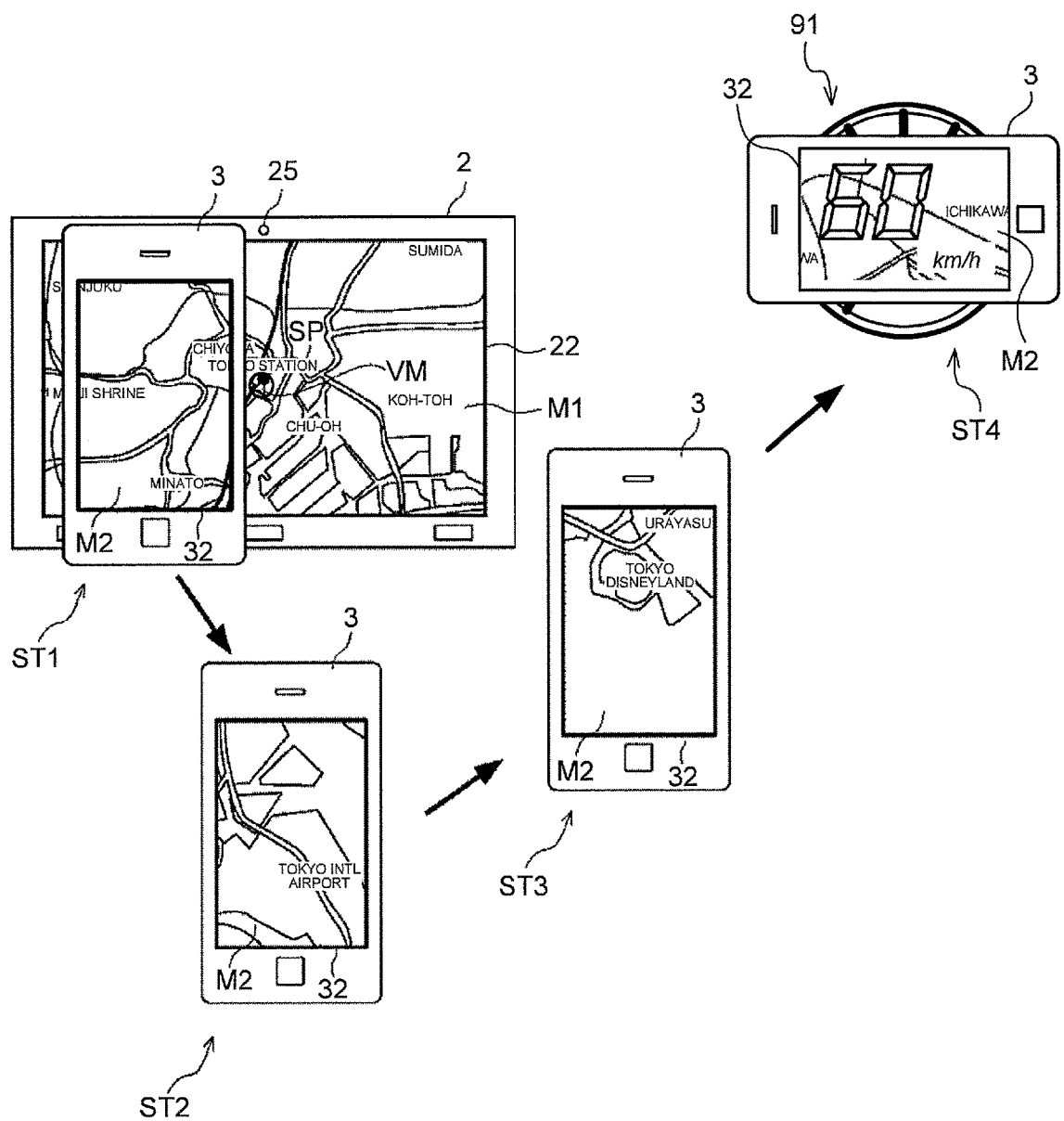
FIG. 5B is a diagram illustrating a state of information display by the in-vehicle device in cooperation with the portable communication terminal.

FIG. 5B is a diagram illustrating a state of the information display by the in-vehicle device 2 in corporation with the portable communication terminal 3 in the event of the current position the same as that in FIG. 5A. In such a case, the in-vehicle device 2 also permits the display 22 to present the on-vehicle map M1 of the area including the current position.

Meanwhile, the portable communication terminal 3 presents on its display 32 a map (referred to as 'on-terminal map' hereinafter) of an area that is drawn on the same scale but is different from the area now on the on-vehicle map M1. The on-terminal map M2 is a map of the area varied according to the relative position of the portable communication terminal 3 to the in-vehicle device 2. Hence, when the user holds the portable communication terminal 3 and moves it, the on-terminal map M2 of the area varied according to such motion is represented on the display 32.

When the portable communication terminal 3 is moved almost in parallel with the screen of the display 22 in the in-vehicle device 2, the portable communication terminal 3 displays the on-terminal map M2 scrolled in association with such motion. An amount of scrolling the on-terminal map M2 in such a way is almost identical with an actual displacement of the portable communication terminal 3. Also, a direction of scrolling the on-terminal map M2 is almost identical with the direction the portable communication terminal 3 moves in. As a consequence, the portable communication terminal 3 displays the on-terminal map M2 of the area corresponding to a position of its destination.

For instance, when, as illustrated in a situation ST1, the portable communication terminal 3 overlies the screen of the display 22, the portable communication terminal 3 displays the on-terminal map M2 of an area from the on-vehicle map M1 displayed by the in-vehicle device 2 and overlaid with the portable communication terminal 3.

Further, when, as illustrated in a situation ST2, the portable communication terminal 3 is moved to a point lower than the screen of the display 22 in the in-vehicle device 2, the portable communication terminal 3 displays the on-terminal map M2 of an area lower than (i.e., in the south of) the on-vehicle map M1 displayed by the in-vehicle device 2. In the example illustrated in FIG. 5B, the on-terminal map M2 of the area in the vicinity of the 'Airport' situated in the south of the 'Tokyo Station' is displayed on the portable communication terminal 3.

Furthermore, when, as illustrated in a situation ST3, the portable communication terminal 3 is moved to a point on the right lower side of the screen of the in-vehicle device 2, the portable communication terminal 3 displays the on-terminal map M2 of an area on the right lower side (i.e., in the southeast) of the on-vehicle map M1 displayed by the in-vehicle device 2. In the example illustrated in FIG. 5B, the on-terminal map M2 of the area in the vicinity of the 'Theme Park' situated in the southeast of the 'Tokyo Station' is displayed on the portable communication terminal 3. An additional situation ST4 will be discussed later.

Thus, the user, holding and moving the portable communication terminal 3, can view the map of the desired area different from the area presented on the display 22 in the in-vehicle device 2. In this situation, the on-vehicle map M1 is presented on the display 22 in the in-vehicle device 2, and the display of the on-terminal map M2 on the portable communication terminal 3 does not exert an effect on the display of the on-vehicle map M1 on the in-vehicle device 2. Hence, the driver, viewing the on-vehicle map M1 displayed on the in-vehicle device 2, can recognize as usual the area in the vicinity of the current position.

Figure 5C:
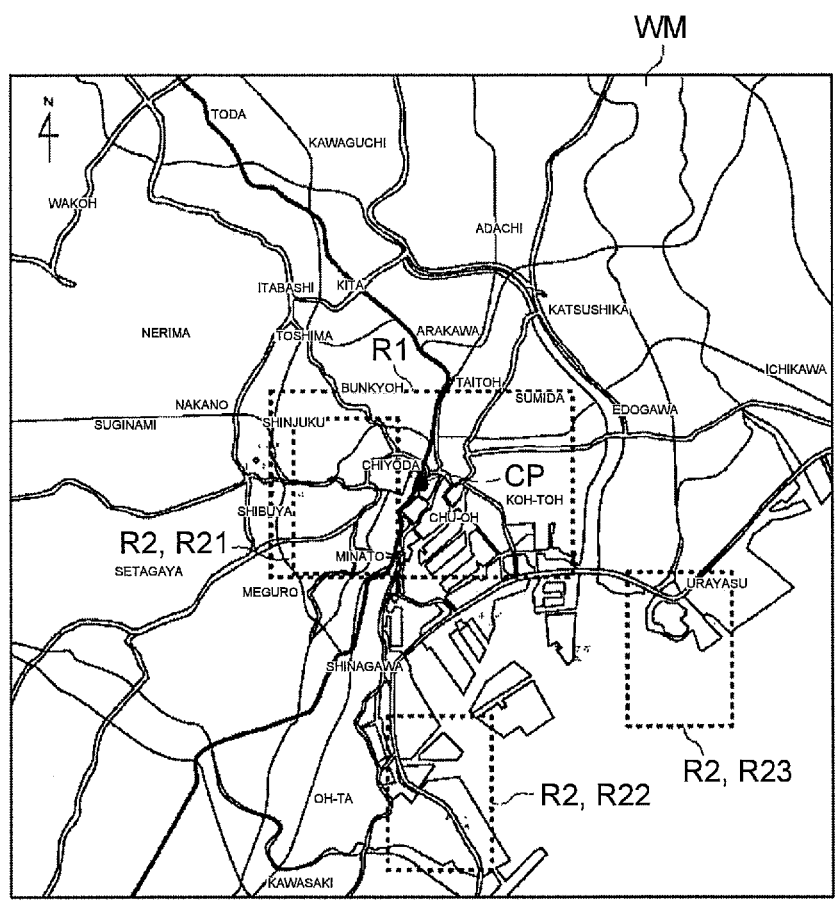
FIG. 5C is a diagram illustrating an example of a wider-area map.

In displaying the on-terminal map M2 in such a way, a wider-area map WM of an area wider than that of the on-vehicle map M1 is produced. The wider-area map WM is equivalent to the aforementioned 'imaginary enlarged image'. FIG. 5C illustrates an example of such a wider-area map WM. The center position (referred to as 'map center' hereinafter) CP of the wider-area map WM is a position denoting the center position (i.e., the 'reference position' mentioned above) on the screen of the display 22 in the in-vehicle device 2. Thus, the map center CP is the current position that is a position where the vehicle 9 is at present. The on-vehicle map M1 displayed on the in-vehicle device 2 is produced by clipping the wider-area map WM to cut out a partial region R1 having the current position as its center.

On the other hand, the on-terminal map M2 displayed on the portable communication terminal 3 is produced by clipping the wider-area map WM to cut out a partial region R2 corresponding to the position of the portable communication terminal 3. Hereinafter, the region R2 in the wider-area map WM to clip out of it to serve as the on-terminal map M2 is referred to as 'on-terminal map region'.

A position of the on-terminal map region R2 relative to the map center CP is almost identical with the real position of the portable communication terminal 3 relative to the reference position SP. This means that a direction of the on-terminal map region R2 relative to the map center CP is almost identical with the real direction of the portable communication terminal 3 relative to the reference position SP. Also, an imaginary distance from the map center CP to the on-terminal map region R2 is almost identical with the real distance from the reference position SP to the portable communication terminal 3. In computing the imaginary distance from the map center CP to the on-terminal map region R2, resolution and size of the screen of the display 32 in the portable communication terminal 3 are counted. In this way, the portable communication terminal 3 displays the on-terminal map M2 of the area according to the relative position to the reference position SP.

For example, in the situation ST1 illustrated in FIG. 5B, the portable communication terminal 3 lies on the left relative to the reference position SP. Hence, in the situation ST1, a region R21 on the left relative to the map center CP in the wider-area map WP illustrated in FIG. 5C is clipped as the on-terminal map region R2 to serve as the on-terminal map M2.

Also, in the situation ST2 illustrated in FIG. 5B, the portable communication terminal 3 lies on the lower side relative to the reference position SP. Hence, in the situation ST2, a region R22 on the lower side relative to the map center CP in the wider-area map WM in FIG. 5C is clipped as the on-terminal map region R2 to serve as the on-terminal map M2.

Further, in the situation ST3 in FIG. 5B, the portable communication terminal 3 lies on the right lower side relative to the reference position SP. Hence, in the situation ST3, a region R23 on the right lower side relative to the map center CP in the wider-area map WM in FIG. 5C is clipped as the on-terminal map region R2 to serve as the on-terminal map M2.

It is now assumed that, as in the situation ST4 in FIG. 5B, the portable communication terminal 3 is moved to a position remote from the screen of the in-vehicle device 2 and slightly on the right upper side of the same. In such a situation, the portable communication terminal 3 displays the on-terminal map M2 of an area slightly on the right upper side (i.e., in the east-northeast) of the on-vehicle map M1 displayed on the in-vehicle device 2, and when the terminal position is any of the predetermined positions, information display regarding the displayed contents of the specific process corresponding to the predetermined position is given priority.

For example, in the example of FIG. 5B, since the terminal position is the predetermined position in the vicinity of the speed meter 91, presenting the displayed contents (see FIG. 10) of the specific process corresponding to the predetermined position in the vicinity of the speed meter 91 is given priority by superimposing the displayed contents on the on-terminal map M2 of the area in the east-northeast of the 'Tokyo Station' and slightly remote from the same. Alternatively, only the displayed contents of the specific process may be presented prior to anything else without superimposition on the on-terminal map M2.

As has been described, according to the second embodiment, in the event that the portable communication terminal 3 reaches any of the predetermined positions while the information display by the in-vehicle device 2 and the portable communication terminal 3 in corporation with each other is being effectuated, the information display of the specific process executable corresponding to the predetermined position is performed. In this way, even when the information display by the in-vehicle device 2 and the portable communication terminal 3 in corporation with each other is being effectuated, the user can be provided with display of priority information such as the information display of the specific process executable corresponding to the predetermined position.

Figure 6:
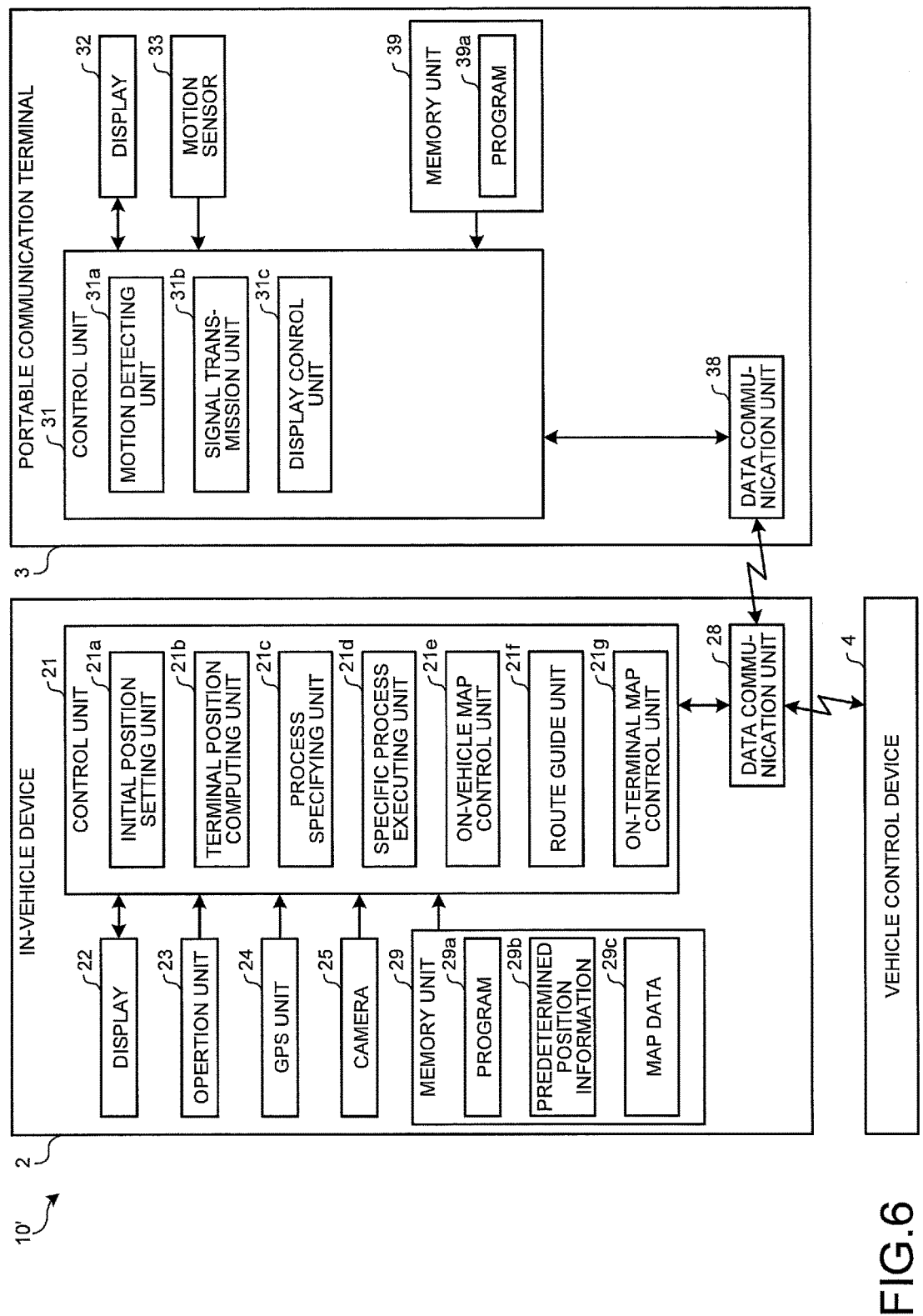
FIG. 6 is a diagram illustrating a configuration of an information processing system according to a second embodiment.

Now, a configuration of an information processing system 10' according to the second embodiment will be described. FIG. 6 is a diagram illustrating the configuration of the information processing system 10' according to the second embodiment. As to the second embodiment, components different from those of the first embodiment will be primarily described, and a detailed description of the components already discussed will be cut short or omitted.

The in-vehicle device 2 according to the second embodiment further includes a GPS unit 24 and is varied from the first embodiment in that a map data 29c is further stored in the memory unit 29. An on-vehicle map control unit 21e, a route guide unit 21f, and an on-terminal map control unit 21g are added as part of the processing unit implemented through software-based virtualization by executing the program 29a.

The GPS unit 24 receives signals from a plurality of GPS satellites to obtain the position (the absolute position on the earth) the in-vehicle device 2 lies in at present. Since the in-vehicle device 2 is loaded in the vehicle 9, the GPS unit 24 practically obtains the position the vehicle 9 lies in at present (the current position). The current position the GPS unit 24 obtains, which is expressed, for example, in longitude and latitude, can be used as information to determine a position in a map.

The on-vehicle map control unit 21e produces the on-vehicle map M1 to present on the display 22 of the in-vehicle device 2, and permits the display 22 to present it. Also, the on-vehicle map control unit 21e uses the map data 29c stored in the memory unit 29 to produce the on-vehicle map M1 of an area including the current position. Further, the on-vehicle map control unit 21e controls the display 22 to permit the display 22 to present the on-vehicle map M1 thus produced.

The route guide unit 21f presents a route to a destination. The route guide unit 21f, using the map data 29c stored in the memory unit 29, computes a route from the current position to the destination set by the user, and then, superimposes the computed route on the on-vehicle map M1 produced by the on-vehicle map control unit 21e. In this way, the user can be provided with the route to his or her destination.

The on-terminal map control unit 21g, along with the initial position setting unit 21a and the terminal position computing unit 21b already mentioned, executes a process involved in the cooperation with the portable communication terminal 3. Details of the processing executed by the initial position setting unit 21a, the terminal position computing unit 21b, and the on-terminal map control unit 21g will be described later.

Figure 7A:
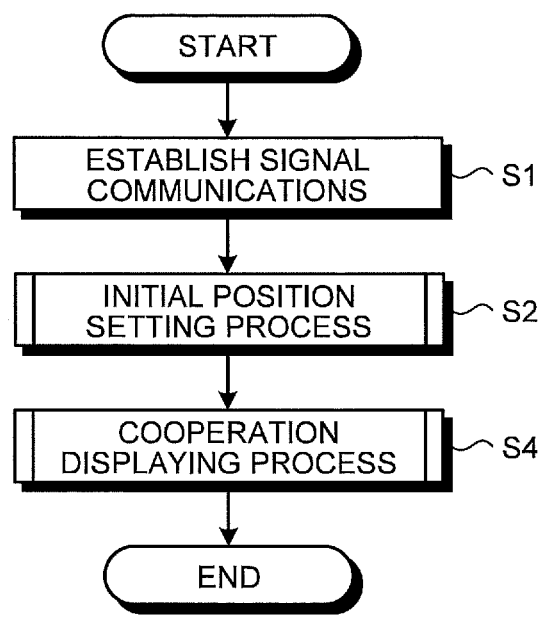
FIG. 7A is a diagram illustrating a processing sequence until a cooperation displaying process according to the second embodiment.

Then, a processing sequence executed in the information processing system 10' until the cooperation displaying process will be described with reference to FIG. 7A. FIG. 7A is a diagram illustrating the processing sequence until the cooperation processing process according to the second embodiment. Since FIG. 7A corresponds to FIG. 3A, and the processing sequence in and before Step S2 is similar to that of the first embodiment, Step S4 and the succeeding will be primarily explained below.

From the step S1 through the step S2, the in-vehicle device 2 and the portable communication terminal 3 are enabled to communicate with each other, and after the initial position of the portable communication terminal 3 is set, the cooperation displaying process is executed where the in-vehicle device 2 and the portable communication terminal 3 work cooperatively to display maps (Step S4). Such cooperation displaying process, as stated above, permits the portable communication terminal 3 to display the on-terminal map M2 of an area corresponding to a relative position to the reference position SP.

Next, the succeeding processing sequence where the in-vehicle device 2 and the portable communication terminal 3 work cooperatively to display maps (Step S4 in FIG. 7A) will be described. FIG. 7B is a diagram illustrating a processing sequence of the cooperation displaying process according to the second embodiment. The left column in the drawing illustrates the processing on the in-vehicle device 2 while the right column in the drawing illustrates the processing on the portable communication terminal 3. The processing sequence illustrated in FIG. 7B is iterated at a given cycle (e.g., 1/30 seconds per cycle).

First, the on-vehicle map control unit 21e in the in-vehicle device 2 controls the GPS unit 24 to obtain the current position that is the position where the vehicle 9 is at present in the map (Step S41).

Next, the on-vehicle map control unit 21e produces the wider-area map WM of an area wider than the area of the on-vehicle map M1 (Step S42). The on-vehicle map control unit 21e, using the map data 29c stored in the memory unit 29, produces the wider-area map WM having the current position as its map center CP, as illustrated in FIG. 5C.

Subsequently, the on-vehicle map control unit 21e produces the on-vehicle map M1 and permits the display 22 to present it (Step S43). The on-vehicle map control unit 21e produces the on-vehicle map M1 by clipping the region R1 of which center is the current position in the wider-area map WM. Also, the on-vehicle map control unit 21e controls the display 22 and permits the display 22 to present the on-vehicle map M1 produced.

In this way, the on-vehicle map M1 having the current position as its center is displayed on the in-vehicle device 2. When the destination has been set, the route guide unit 21f superimposes the route to the destination on the on-vehicle map M1 before presenting it on the display 22. Hence, the user (the driver in most cases), viewing the on-vehicle map M1 presented by the display 22, recognizes the vicinity of the current position and the route to the destination.

In this way, the in-vehicle device 2 displays the on-vehicle map M1, and meanwhile in the portable communication terminal 3, the motion sensor 33 detects motions of the portable communication terminal 3 (Step S44). Since the processing from Step S44 to Step S48 is similar to the processing from Step S31 to Step S35 illustrated in FIG. 3C, an explanation is omitted herein.

Subsequent to this, the process specifying unit 21c determines, based on the computed relative position of the portable communication terminal 3 to the reference position SP, whether or not the terminal position is any of the predetermined positions (Step S49). If the terminal position is the predetermined position (Step S49, Yes), the process specifying unit 21c, referring to the predetermined position information 29b, specifies a process corresponding to the predetermined position (Step S50).

Thus, the specific process executing unit 21d executes the specific process corresponding to the predetermined position (Step S51). In addition, the specific process executing unit 21d controls the data communication unit 28 to send to the portable communication terminal 3 the displayed contents (not illustrated) according to the specific process executing. In this way, the specific process executing unit 21d permits the portable communication terminal 3 to present the displayed contents of the specific process.

Otherwise, when the terminal position is not any of the predetermined positions (Step S49, No), the on-terminal map control unit 21g produces the on-terminal map M2 based upon the relative position of the portable communication terminal 3 to the reference position SP (Step S52). The on-terminal map control unit 21g defines the on-terminal map region R2 in the wider-area map WM so that a relative position of the on-terminal map region R2 to the map center CP is identical with the real relative position of the portable communication terminal 3 to the reference position SP. Then, the on-terminal map control unit 21g produces the on-terminal map M2 by clipping the defined on-terminal map region R2 out of the wider-area map WM.

Next, the on-terminal map control unit 21g controls the data communication unit 28 to send the on-terminal map M2 thus produced to the portable communication terminal 3 (Step S53). In this way, the on-terminal map control unit 21g permits the portable communication terminal 3 to display the on-terminal map M2.

In accordance with the processing sequence illustrated from Step S49 to Step S52, the displayed contents of the specific process and the on-terminal map M2 are sent exclusively to the portable communication terminal 3 and then displayed exclusively on the portable communication terminal 3.

At this point of time, the processing sequence from Step S50 to Step S51 and the processing sequence from Step S52 to Step S53 may be executed in parallel, and then, the displayed contents of the specific process and the on-terminal map M2 together may be sent to the portable communication terminal 3. In such a situation, the portable communication terminal 3 may present the displayed contents of the specific process superimposed on the on-terminal map M2.

The displayed contents of the specific process or the on-terminal map M2 transmitted from the in-vehicle device 2 are received by the data communication unit 38 of the portable communication terminal 3 (Step S54). In response to the receipt, the display control unit 31c of the portable communication terminal 3 controls the display 32 and permits the display 32 to present the displayed contents of the specific process or the on-terminal map M2 (Step S55). In this way, the portable communication terminal 3 presents the displayed contents of the specific process corresponding to the predetermined position or the on-terminal map M2 of the area corresponding to the relative position to the reference position SP.

Discussed below will be several examples of the specific process that, when the in-vehicle device 2 and the portable communication terminal 3 work cooperatively to perform information display, are to be executed in the event that the portable communication terminal 3 reaches any of the predetermined positions and is handled for the definite operation. FIG. 8 is a list illustrating concrete examples of the specific process according to the second embodiment. What are illustrated in FIG. 8 are provided merely by way of example and are not interpreted as limiting types of the specific process.

As illustrated in FIG. 8, in the event not only that the in-vehicle device 2 is in operation of navigation but also, for instance, that it is in operation of replaying a piece of music, the portable communication terminal 3 can take over the task of auxiliary display of the aforementioned imaginary enlarged image when the portable communication terminal 3 lies in an arbitrary position.

For instance, as illustrated in FIG. 8, the portable communication terminal 3 lying in an arbitrary position can be permitted to display part of listed information that is too much to present on the display 22 of the in-vehicle device 2. On the other hand, when the portable communication terminal 3 lies in the predetermined position, the portable communication terminal 3 can be permitted to display a screen available for audio settings like equalizer tuning, right-to-left/front-to-rear speakers balancing, and so forth, and thus, permitted to perform a function involved in the specific process such as prompting the user to enter the audio settings from such a screen.

This is similarly attainable, as illustrated in FIG. 8, when the in-vehicle device 2 displays an input interface, a user's manual, a TV program, or the like. In this way, even when the information display by the in-vehicle device 2 and the portable communication terminal 3 in corporation with each other is being effectuated, the specific process corresponding to the predetermined position can be executed in the event that the portable communication terminal 3 lies in the predetermined position. In other words, the convenience of the portable communication terminal 3 can be exploited, and simultaneously, the information processing corresponding to any of predetermined positions in a given facility can be facilitated.

As has been described, the information processing system according to the second embodiment includes an in-vehicle device (electronic device), a portable communication terminal, a terminal position computing unit (computing unit), and a specific process executing unit (executing unit). The in-vehicle device is provided in a vehicle (given facility). The portable communication terminal is in mutual communication with the in-vehicle device. The terminal position computing unit computes a position of the portable communication terminal based upon motions of the portable communication terminal. When the position of the portable communication terminal computed by the terminal position computing unit is any of predetermined positions that are predefined in the vehicle, the specific process executing unit executes a specific process corresponding to that predetermined position.

Also, the information processing system according to the second embodiment has a cooperation displaying function in which display by the in-vehicle device and display by the portable communication terminal work cooperatively so as to display an imaginary enlarged image that is beyond the display area of the in-vehicle device while the portable communication terminal displays part of the imaginary enlarged image corresponding to the position of the portable communication terminal computed by the terminal position computing unit and presents displays about the specific process corresponding to the predetermined position in the event that the position of the portable communication terminal is the predetermined position.

Thus, in accordance with the information processing system according to the second embodiment, the convenience of the portable communication terminal can be exploited, and simultaneously, the information processing corresponding to any of the predetermined positions in the vehicle can be facilitated. Additionally, even when the cooperation displaying function in which the in-vehicle device and the portable communication terminal have their respective displays work cooperatively is being effectuated, the portable communication terminal, when it lies in the predetermined position, presents the display about the specific process corresponding to the predetermined position, so as to assuredly provide the user with the information suitable to the predetermined position.

Although, in the aforementioned first and second embodiments, the examples that the position where the portable communication terminal 3 lies is computed as a relative position to the reference position SP have been described, such computation of the position of the portable communication terminal 3 is not interpreted as limitation to such methods.

For instance, the position of the portable communication terminal 3 in the vehicle interior 90 may be computed based upon photographed images a camera provided in the portable communication terminal 3 itself captures, by any method known in the art such as pattern matching.

Also, for instance, a configuration that can bring about direct acquisition of the position information by the portable communication terminal 3 may alternatively be attained by any method well known, such as an NFC (Near Field Communication) tag, an iBeacon™, or the like, utilizing near field wireless communication.

Moreover, the portable communication terminal 3 may be adapted to independently do all from acquiring the information of its position to executing the specific process. In such a case, the functions of the components of the processing unit including the terminal position computing unit 21b, the process specifying unit 21c, the specific process executing unit 21d, and the like illustrated in FIG. 2 are implemented, for instance, through software-based virtualization in the control unit 31 of the portable communication terminal 3.

Although, in the aforementioned first and second embodiments, the examples in terms of the predetermined positions in the vehicle interior 90 have been described, each of the embodiments of the present application is applicable without limitation to in-vehicle instruments so far as it is in terms of predetermined positions in a given facility.

For instance, a residential building may be regarded as one type of the given facility with an electronic device. Such a case will be explained as a third embodiment with reference to FIG. 9.

[c] Third Embodiment

Figure 9:
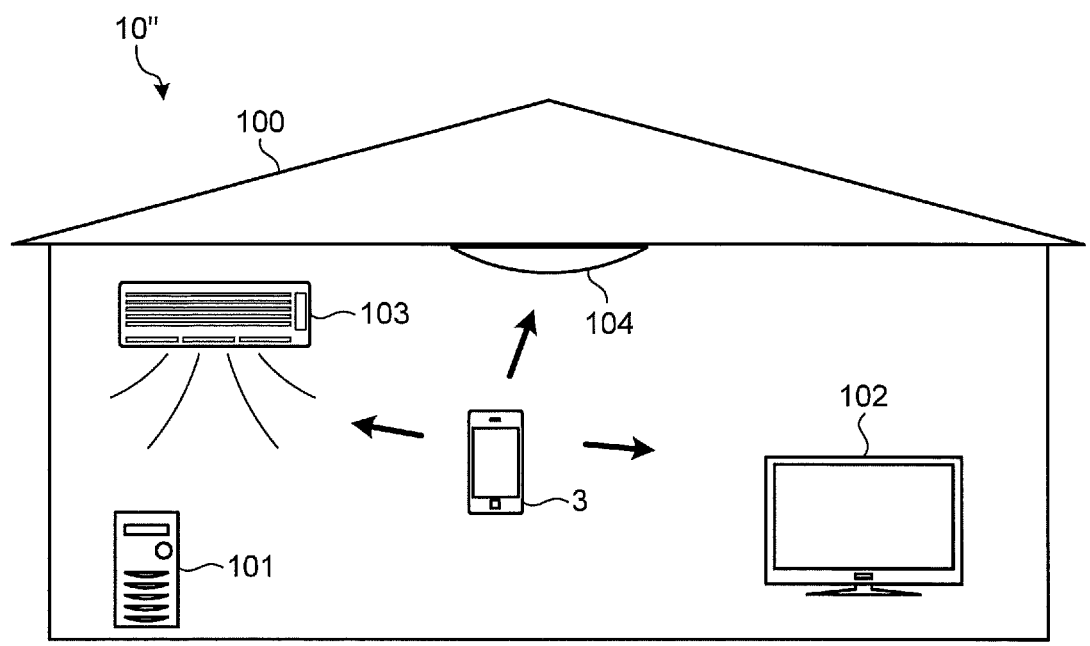
FIG. 9 is a diagram illustrating a configuration of an information processing system according to a third embodiment.

FIG. 9 is a diagram illustrating a configuration of an information processing system 10" according to the third embodiment. The information processing system 10" includes a residential building 100 as the facility. The residential building 100 is provided with a home server 101, a TV set 102, an air conditioner 103, a lightening appliance 104, and the like.

The home server 101 works as the core of a communication network in the residential building 100 and provides a variety of data and services to the instruments in rooms connected to the network. For example, the home server 101 stores predetermined position information about predetermined positions in living space of the residential building 100 and a specific process executable corresponding to each of the predetermined positions. The home server 101 is equivalent to the in-vehicle device 2 in the context of the vehicle 9.

Also, the home server 101 computes a terminal position of the portable communication terminal 3 that is being moved, and when the terminal position is any of the predetermined positions that are predefined, the home server 101 permits the portable communication terminal 3 to execute the specific process corresponding to the predetermined position.

In one example, the portable communication terminal 3 is moved and reaches to any of the predetermined positions of a TV set 102, an air conditioner 103, and a lightening appliance 104, and when the portable communication terminal 3 is handled for a given definite operation, the home server 101 permits it to execute the specific process to serve as a remote controller for each of the TV set 102, the air conditioner 103, and the lightening appliance 104.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system causing a portable communication terminal to cooperate with an electronic device, the electronic device being provided in a vehicle, the portable communication terminal being capable of mutual communication with the electronic device, the electronic device comprising:

a memory storing map data; and a processor operatively coupled to the memory, the processor being programmed to:

receive a signal indicating a motion of the portable communication terminal inside the vehicle from the portable communication terminal;

compute a position of the portable communication terminal inside the vehicle based upon the received signal;

in response to the computed position of the portable communication terminal being at a predetermined position that is predefined in the vehicle, cause the portable communication terminal to display an on-terminal map region that is a region different from an on-vehicle map region of the electronic device:

generate a wider-area map region from the stored map data, the wider-area map region being wider than the on-vehicle map region, wherein the on-terminal map region indicates a region to be displayed by the portable communication terminal and the on-vehicle map region indicates a region to be displayed by the electronic device from among the wider-area map region;

clip a part of the wider-area map region corresponding to the predetermined position;

cause the portable communication terminal to display the clipped part of the wider-area map region; and cause the portable communication terminal to display specific information on at least one of operating situation of the vehicle, peripheral situation of the vehicle, maintenance situation of the vehicle, and in-vehicle comfort of an occupant, when the portable communication terminal is in a vicinity of an on-vehicle device corresponding to the specific information, the specific information not including map information.

2. The information processing system according to claim 1, wherein the electronic device is an in-vehicle device loaded in the vehicle.

3. The information processing system according to claim 2, wherein the predetermined position is defined as a vicinity of an instrument board in the vehicle, and the portable communication terminal, when being located in a predetermined position in the vicinity of the instrument board, performs auxiliary display of a meter in the instrument board.

4. The information processing system according to claim 1, wherein the processor is programmed to:
cause the portable communication terminal to display the specific information and the clipped part in a superimposed manner.

5. The information processing system according to claim 4, wherein
the predetermined position is defined as a vicinity of an instrument board in the vehicle, and
the portable communication terminal, when being located in a predetermined position in the vicinity of the instrument board, performs auxiliary display of a meter in the instrument board.

6. The information processing system according to claim 1, wherein
the predetermined position is defined as a vicinity of an instrument board in the vehicle, and
the portable communication terminal, when being located in a predetermined position in the vicinity of the instrument board, performs auxiliary display of a meter in the instrument board.

7. The information processing system according to claim 1, further comprising
a holder provided in the predetermined position to hold the portable communication terminal in the predetermined position, and wherein
the processor is programmed to execute a specific process corresponding to the predetermined position in which the holder is provided when the portable communication terminal is held by the holder.

8. The information processing system according to claim 1, wherein the processor is programmed to execute a specific process corresponding to the predetermined position when a predetermined definite operation is performed on the portable communication terminal in the predetermined position.

9. The information processing system according to claim 8, wherein the portable communication terminal terminates display about the specific process when a predetermined cancel operation for canceling the definite operation is performed.

10. The information processing system according to claim 1, further comprising
a control device provided in the vehicle and capable of mutual communication with the electronic device, wherein
the control device is connected to various instruments provided in the vehicle,
the processor is programmed to execute a specific process corresponding to the predetermined position, and
in the specific process, the portable communication terminal sends, via the electronic device to the control device, setting signals including arbitrary setting values directed to the various instruments, and causes the control device to execute a setting process of the various instruments according to the setting signals.

11. The information processing system according to claim 1, wherein
the processor is further programmed to cause a display of the electronic device to display the on-vehicle map region that includes a current position of the vehicle, and
the on-terminal map region includes an area according to a relative position of the portable communication terminal to the electronic device in the wider-area map region.

12. An information processing method for an information processing system that causes a portable communication terminal to cooperate with an electronic device, the electronic device being provided in a vehicle and including a memory storing map data, the portable communication terminal being capable of mutual communication with the electronic device, the method comprising:
receiving a signal indicating a motion of the portable communication terminal inside the vehicle from the portable communication terminal;
computing a position of the portable communication terminal inside the vehicle based upon the received signal;
in response to the computed position of the portable communication terminal being at a predetermined position that is predefined in the vehicle, cause the portable communication terminal to display an on-terminal map region that is a region different from an on-vehicle map region of the electronic device, a wider-area map region that is wider than the on-vehicle map region:
generating a wider-area map region from the stored map data, the wider-area map region being wider than the on-vehicle map region, wherein the on-terminal map region indicates a region to be displayed by the portable communication terminal and the on-vehicle map region indicates a region to be displayed by the electronic device from among the wider-area map region;
clipping a part of the wider-area map region corresponding to the predetermined position to generate the on-vehicle map region;
causing the portable communication terminal to display the clipped part of the wider-area map region; and
cause the portable communication terminal to display specific information on at least one of operating situation of the vehicle, peripheral situation of the vehicle, maintenance situation of the vehicle, and in-vehicle comfort of an occupant, when the portable communication terminal is in a vicinity of an on-vehicle device corresponding to the specific information, the specific information not including map information.

* * * * *